United States Patent
Wada et al.

(10) Patent No.: US 7,623,172 B2
(45) Date of Patent: Nov. 24, 2009

(54) SOLID-STATE IMAGE PICKUP DEVICE AND DRIVE METHOD THEREOF

(75) Inventors: Takamasa Wada, Kanagawa (JP); Eiichi Funatsu, Tokyo (JP); Keiji Mabuchi, Kanagawa (JP); Ken Nakajima, Tokyo (JP); Katsuaki Hirota, Kanagawa (JP); Nobuyuki Satou, Tokyo (JP); Takashi Abe, Kanagawa (JP); Tomoyuki Umeda, Kanagawa (JP); Nobuo Nakamura, Kanagawa (JP); Hiroaki Fujita, Kanagawa (JP); Hiroki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 10/545,740

(22) PCT Filed: Feb. 20, 2004

(86) PCT No.: PCT/JP2004/002006

§ 371 (c)(1), (2), (4) Date: Aug. 16, 2005

(87) PCT Pub. No.: WO2004/075564

PCT Pub. Date: Sep. 2, 2004

(65) Prior Publication Data

US 2006/0203113 A1   Sep. 14, 2006

(30) Foreign Application Priority Data

Feb. 21, 2003   (JP)   ............................. 2003-043897

(51) Int. Cl.
H04N 3/14   (2006.01)
H04N 5/335   (2006.01)
H04N 5/228   (2006.01)

(52) U.S. Cl. ................... 348/302; 348/273; 348/222.1

(58) Field of Classification Search .................. 348/302, 348/273–283, 222.1, 308
See application file for complete search history.

(56) References Cited

U.S. PATENT DOCUMENTS 6,198,507 B1 *   3/2001   Ishigami .................... 348/273

(Continued)

FOREIGN PATENT DOCUMENTS

JP   09-247689   9/1997

(Continued)

*Primary Examiner*—Lin Ye
*Assistant Examiner*—Mekonnen Dagnew
(74) *Attorney, Agent, or Firm*—Sonnenschein Nath & Rosenthal LLP

(57) ABSTRACT

A solid state imaging device having an X-Y addressable solid state imaging device with color filters and a driving unit which reads out pixel information of a same color filter in a unit pixel block as pixel information for one pixel simulatively. A predetermined color coding for the pixels has two rows and two columns. When k is a positive integer equal to or larger than 0, with (2k+3)×(2k+3) pixel blocks as unit pixel blocks, the driving unit reads out pieces of pixel information of the same color filter in each of the unit pixel blocks, the driving unit reads out pieces of pixel information of a same color filter in each of the unit pixel blocks simulatively as pixel information for one pixel in a state in which the unit pixel blocks are laid without overlapping one another, and the driving unit averages the added pieces of pixel information and outputs the averaged pieces of pixel information.

11 Claims, 35 Drawing Sheets

U.S. PATENT DOCUMENTS

| | | |
|---|---|---|
| 6,922,714 B2 * | 7/2005 | Luick .................. 708/503 |
| 6,972,791 B1 | 12/2005 | Yomeyama |
| 6,992,706 B2 | 1/2006 | Mabuchi et al. |
| 7,265,783 B2 * | 9/2007 | Fukuda ................ 348/240.2 |
| 2001/0010554 A1 * | 8/2001 | Yoshida ................ 348/312 |

FOREIGN PATENT DOCUMENTS

| JP | 11-146278 | 5/1999 |
|---|---|---|
| JP | 2000-4406 | 1/2000 |
| JP | 2001-292376 | 10/2001 |
| JP | 2001-292453 | 10/2001 |
| JP | 2001-298748 | 10/2001 |
| JP | 2002-320146 | 10/2002 |
| JP | 2003-230054 | 8/2003 |

* cited by examiner

IMAGINARY PIXEL COLUMN NAME →

|   |   | 1 | 2 | 3 | 4 | 5 | 6 | 7 | 8 | 9 |
|---|---|---|---|---|---|---|---|---|---|---|
|   |   |   | a |   |   | b |   |   | c |   |
|   | 1 | G | B | G | B | G | B | G | B | G |
| a | 2 | R | R | R | G | G | G | R | R | R |
|   | 3 | G | B | G | B | G | B | G | B | G |
|   | 4 | R | G | R | G | R | G | R | G | R |
| b | 5 | G | G | G | B | B | B | G | G | G |
|   | 6 | R | G | R | G | R | G | R | G | R |
|   | 7 | G | B | G | B | G | B | G | B | G |
| c | 8 | R | R | R | G | G | G | R | R | R |
|   | 9 | G | B | G | B | G | B | G | B | G |

↑ IMAGINARY PIXEL ROW NAME

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | G | B | G | B | G | B | G | B | G | B | G | B | G | B | G |
| 2 | R | G | R | G | R | G | R | G | R | G | R | G | R | G | R |
| 3 | G | B | G | B | G | B | G | B | G | B | G | B | G | B | G |
| 4 | R | G | R | G | R | G | R | G | R | G | R | G | R | G | R |
| 5 | G | B | G | B | G | B | G | B | G | B | G | B | G | B | G |
| 6 | R | G | R | G | R | G | R | G | R | G | R | G | R | G | R |
| 7 | G | B | G | B | G | B | G | B | G | B | G | B | G | B | G |
| 8 | R | G | R | G | R | G | R | G | R | G | R | G | R | G | R |
| 9 | G | B | G | B | G | B | G | B | G | B | G | B | G | B | G |
| 10 | R | G | R | G | R | G | R | G | R | G | R | G | R | G | R |

FIG. 12B

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | G | B | G | B | G | B | G | B | G | B | G | B | G | B | G |
| 2 | R | G | R | G | R | G | R | G | R | G | R | G | R | G | R |
| 3 | G | B | G | B | G | B | G | B | G | B | G | B | G | B | G |
| 4 | R | G | R | G | R | G | R | G | R | G | R | G | R | G | R |
| 5 | G | B | G | B | G | B | G | B | G | B | G | B | G | B | G |
| 6 | R | G | R | G | R | G | R | G | R | G | R | G | R | G | R |
| 7 | G | B | G | B | G | B | G | B | G | B | G | B | G | B | G |
| 8 | R | G | R | G | R | G | R | G | R | G | R | G | R | G | R |
| 9 | G | B | G | B | G | B | G | B | G | B | G | B | G | B | G |
| 10 | R | G | R | G | R | G | R | G | R | G | R | G | R | G | R |

FIG. 12C

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | G | B | G | B | G | B | G | B | G | B  | G  | B  | G  | B  | G  |
| 2 | R | G | R | G | R | G | R | G | R | G  | R  | G  | R  | G  | R  |
| 3 | G | B | G | B | G | B | G | B | G | B  | G  | B  | G  | B  | G  |
| 4 | R | G | R | G | R | G | R | G | R | G  | R  | G  | R  | G  | R  |
| 5 | G | B | G | B | G | B | G | B | G | B  | G  | B  | G  | B  | G  |
| 6 | R | G | R | G | R | G | R | G | R | G  | R  | G  | R  | G  | R  |
| 7 | G | B | G | B | G | B | G | B | G | B  | G  | B  | G  | B  | G  |
| 8 | R | G | R | G | R | G | R | G | R | G  | R  | G  | R  | G  | R  |
| 9 | G | B | G | B | G | B | G | B | G | B  | G  | B  | G  | B  | G  |
| 10| R | G | R | G | R | G | R | G | R | G  | R  | G  | R  | G  | R  |

FIG. 12D

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | G | B | G | B | G | B | G | B | G | B  | G  | B  | G  | B  | G  |
| 2 | R | G | R | G | R | G | R | G | R | G  | R  | G  | R  | G  | R  |
| 3 | G | B | G | B | G | B | G | B | G | B  | G  | B  | G  | B  | G  |
| 4 | R | G | R | G | R | G | R | G | R | G  | R  | G  | R  | G  | R  |
| 5 | G | B | G | B | G | B | G | B | G | B  | G  | B  | G  | B  | G  |
| 6 | R | G | R | G | R | G | R | G | R | G  | R  | G  | R  | G  | R  |
| 7 | G | B | G | B | G | B | G | B | G | B  | G  | B  | G  | B  | G  |
| 8 | R | G | R | G | R | G | R | G | R | G  | R  | G  | R  | G  | R  |
| 9 | G | B | G | B | G | B | G | B | G | B  | G  | B  | G  | B  | G  |
| 10| R | G | R | G | R | G | R | G | R | G  | R  | G  | R  | G  | R  |

|    | 1 | 2 | 3 | 4 | 5 | 6 | 7 | 8 | 9 | 10 | 11 | 12 | 13 | 14 | 15 | 16 | 17 | 18 | 19 |
|----|---|---|---|---|---|---|---|---|---|----|----|----|----|----|----|----|----|----|----|
| 1  | G | B | G | B | G | B | G | B | G | B  | G  | B  | G  | B  | G  | B  | G  | B  | G  |
| 2  | R | G | R | G | R | G | R | G | R | G  | R  | G  | R  | G  | R  | G  | R  | G  | R  |
| 3  | G | B | G | B | G | B | G | B | G | B  | G  | B  | G  | B  | G  | B  | G  | B  | G  |
| 4  | R | G | R | G | R | G | R | G | R | G  | R  | G  | R  | G  | R  | G  | R  | G  | R  |
| 5  | G | B | G | B | G | B | G | B | G | B  | G  | B  | G  | B  | G  | B  | G  | B  | G  |
| 6  | R | G | R | G | R | G | R | G | R | G  | R  | G  | R  | G  | R  | G  | R  | G  | R  |
| 7  | G | B | G | B | G | B | G | B | G | B  | G  | B  | G  | B  | G  | B  | G  | B  | G  |
| 8  | R | G | R | G | R | G | R | G | R | G  | R  | G  | R  | G  | R  | G  | R  | G  | R  |
| 9  | G | B | G | B | G | B | G | B | G | B  | G  | B  | G  | B  | G  | B  | G  | B  | G  |
| 10 | R | G | R | G | R | G | R | G | R | G  | R  | G  | R  | G  | R  | G  | R  | G  | R  |
| 11 | G | B | G | B | G | B | G | B | G | B  | G  | B  | G  | B  | G  | B  | G  | B  | G  |
| 12 | R | G | R | G | R | G | R | G | R | G  | R  | G  | R  | G  | R  | G  | R  | G  | R  |
| 13 | G | B | G | B | G | B | G | B | G | B  | G  | B  | G  | B  | G  | B  | G  | B  | G  |
| 14 | R | G | R | G | R | G | R | G | R | G  | R  | G  | R  | G  | R  | G  | R  | G  | R  |

|   | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
| 1 | G | B | G | B | G | B | G | B | G | B | G | B | G | B | G | B | G |
| 2 | R | G | R | G | R | G | R | G | R | G | R | G | R | G | R | G | R |
| 3 | G | B | G | B | G | B | G | B | G | B | G | B | G | B | G | B | G |
| 4 | R | G | R | G | R | G | R | G | R | G | R | G | R | G | R | G | R |
| 5 | G | B | G | B | G | B | G | B | G | B | G | B | G | B | G | B | G |
| 6 | R | G | R | G | R | G | R | G | R | G | R | G | R | G | R | G | R |
| 7 | G | B | G | B | G | B | G | B | G | B | G | B | G | B | G | B | G |
| 8 | R | G | R | G | R | G | R | G | R | G | R | G | R | G | R | G | R |
| 9 | G | B | G | B | G | B | G | B | G | B | G | B | G | B | G | B | G |
| 10 | R | G | R | G | R | G | R | G | R | G | R | G | R | G | R | G | R |
| 11 | G | B | G | B | G | B | G | B | G | B | G | B | G | B | G | B | G |
| 12 | R | G | R | G | R | G | R | G | R | G | R | G | R | G | R | G | R |

|   | 1 | 2 | 3 | 4 | 5 | 6 | 7 | 8 | 9 | 10 | 11 | 12 | 13 | 14 |
|---|---|---|---|---|---|---|---|---|---|----|----|----|----|----|
| 1 | G | B | G | B | G | B | G | B | G | B  | G  | B  | G  | B  |
| 2 | R | G | R | G | R | G | R | G | R | G  | R  | G  | R  | G  |
| 3 | G | B | *G* | B | G | *B* | G | B | *G* | B | G | *B* | G | B |
| 4 | R | G | R | G | R | G | R | G | R | G  | R  | G  | R  | G  |
| 5 | G | B | G | B | G | B | G | B | G | B  | G  | B  | G  | B  |
| 6 | R | G | *R* | G | R | *G* | R | G | *R* | G | R | *G* | R | G |
| 7 | G | B | G | B | G | B | G | B | G | B  | G  | B  | G  | B  |
| 8 | R | G | R | G | R | G | R | G | R | G  | R  | G  | R  | G  |
| 9 | G | B | G | B | G | B | G | B | G | B  | G  | B  | G  | B  |

|   | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
| 1 | G | B | G | B | G | B | G | B | G | B  | G  | B  | G  | B  | G  | B  | G  |
| 2 | R | G | R | G | R | G | R | G | R | G  | R  | G  | R  | G  | R  | G  | R  |
| 3 | G | B | G | B | G | B | G | B | G | B  | G  | B  | G  | B  | G  | B  | G  |
| 4 | R | G | R | G | R | G | R | G | R | G  | R  | G  | R  | G  | R  | G  | R  |
| 5 | G | B | G | B | G | B | G | B | G | B  | G  | B  | G  | B  | G  | B  | G  |
| 6 | R | G | R | G | R | G | R | G | R | G  | R  | G  | R  | G  | R  | G  | R  |
| 7 | G | B | G | B | G | B | G | B | G | B  | G  | B  | G  | B  | G  | B  | G  |
| 8 | R | G | R | G | R | G | R | G | R | G  | R  | G  | R  | G  | R  | G  | R  |
| 9 | G | B | G | B | G | B | G | B | G | B  | G  | B  | G  | B  | G  | B  | G  |

FIG. 28D

|   | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
| 1 | G | B | G | B | G | B | G | B | G | B  | G  | B  | G  | B  | G  | B  | G  |
| 2 | R | G | R | G | R | G | R | G | R | G  | R  | G  | R  | G  | R  | G  | R  |
| 3 | G | B | G | B | G | B | G | B | G | B  | G  | B  | G  | B  | G  | B  | G  |
| 4 | R | G | R | G | R | G | R | G | R | G  | R  | G  | R  | G  | R  | G  | R  |
| 5 | G | B | G | B | G | B | G | B | G | B  | G  | B  | G  | B  | G  | B  | G  |
| 6 | R | G | R | G | R | G | R | G | R | G  | R  | G  | R  | G  | R  | G  | R  |
| 7 | G | B | G | B | G | B | G | B | G | B  | G  | B  | G  | B  | G  | B  | G  |
| 8 | R | G | R | G | R | G | R | G | R | G  | R  | G  | R  | G  | R  | G  | R  |
| 9 | G | B | G | B | G | B | G | B | G | B  | G  | B  | G  | B  | G  | B  | G  |

FIG. 29

|   | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
| 1 | G | B | G | B | G | B | G | B | G | B  | G  | B  | G  | B  | G  | B  | G  |
| 2 | R | G | R | G | R | G | R | G | R | G  | R  | G  | R  | G  | R  | G  | R  |
| 3 | G | B | G | B | G | B | G | B | G | B  | G  | B  | G  | B  | G  | B  | G  |
| 4 | R | G | R | G | R | G | R | G | R | G  | R  | G  | R  | G  | R  | G  | R  |
| 5 | G | B | G | B | G | B | G | B | G | B  | G  | B  | G  | B  | G  | B  | G  |
| 6 | R | G | R | G | R | G | R | G | R | G  | R  | G  | R  | G  | R  | G  | R  |
| 7 | G | B | G | B | G | B | G | B | G | B  | G  | B  | G  | B  | G  | B  | G  |
| 8 | R | G | R | G | R | G | R | G | R | G  | R  | G  | R  | G  | R  | G  | R  |
| 9 | G | B | G | B | G | B | G | B | G | B  | G  | B  | G  | B  | G  | B  | G  |
| 10| R | G | R | G | R | G | R | G | R | G  | R  | G  | R  | G  | R  | G  | R  |

DISTANCE BETWEEN PIXELS

DISTANCE BETWEEN PIXELS

DISTANCE BETWEEN PIXELS

SOLID-STATE IMAGE PICKUP DEVICE AND DRIVE METHOD THEREOF

TECHNICAL FIELD

The present invention relates to a solid state imaging apparatus and a driving method therefor, and more particular to a solid state imaging apparatus using an X-Y addressable solid state imaging apparatus and a driving method therefor.

BACKGROUND ART

A solid state imaging apparatus is roughly divided into a charge transfer solid state imaging apparatus represented by, for example, a CCD (Charge Coupled Device) image sensor and an X-Y addressable solid state imaging apparatus represented by, for example, a CMOS (Complementary Metal Oxide Semiconductor) image sensor. This type of solid state imaging apparatus is used in various video apparatuses such as a video camera for photographing moving images and an electronic still camera for photographing still images as an imaging apparatus therefor.

Conventionally, when the CCD image sensor is used as an imaging apparatus in a 1CCD color camera, in a so-called pixel skipping processing for skipping pixel information, for example, a method of reading out pixel information for all pixels from the image sensor and, then, skipping the pixel information in an external signal processing system is adopted. When the CMOS image sensor is used as an imaging apparatus, a method following the pixel skipping processing method in the CCD image sensor is adopted. In such a pixel skipping processing method, although an amount of information is reduced by the pixel skipping processing, since a driving frequency of the image sensor is unchangeable, power consumption is not reduced. On the contrary, this results in a load on the signal processing system.

Reasons for adopting the pixel skipping and readout method of reading out pixel information for all pixels and, then, performing the pixel skipping processing for the pixel information in the external signal processing system are, for example, as follows:
<1> It is impossible to skip pixel information while keeping a spatial arrangement and an output order of color filters;
<2> In an ordinary shift register used as selecting means for selecting pixels, the pixels are selected in order; and
<3> In the CCD image sensor, information can be read out from pixels only in an order.

In order to solve those problems, conventionally, the X-Y addressable solid state imaging apparatus, in which color filters having predetermined color coding are formed for respective pixels arranged in a matrix shape, is used. When pixel skipping and readout is designated for this X-Y addressable solid state imaging apparatus, a clock frequency of a system is changed and pixels are selected in an order corresponding to the color coding on the basis of the changed clock frequency to read out pixels signals, whereby the pixel skipping processing is performed at a stage when pixel information is read out from the pixels (see, for example, a patent document 1 (JP-A-2001-298748)).

As shown in FIG. 31, pixel skipping and readout is performed by half in a color filter arrangement having color coding of a G (green) stripe system with four rows set as a row block and four columns set as a column block. In this case, when a first row of a pixel matrix is read out, in an odd-number column block, first and second columns in the block are read out and, in an even-number column block, first and fourth columns in the block are read out. When a third row of a first row block, that is, a third row of the pixel matrix is read out, in an odd-number column block, first and fourth columns in the block are read out and, in an even-number column block, first and second columns in the block are read out (see, for example, a patent document 2 (JP-A-2000-004406)).

In the first conventional technique disclosed in the patent document 1, it is possible to skip and compress an amount of pixel information without applying a load on the signal processing system. Moreover, it is possible to reduce power consumption following a change in a clock frequency of the system. It is also possible to fix a frame rate even if an operation mode is changed. On the other hand, when pixel information is read out at intervals while subjecting the pixel information to the pixel skipping processing with a system clock set to 1/9 (a pixel skipping ratio set to 1/9), a distance between pixels to be read out increases.

When a distance between pixels is p, a Nyquist frequency fn depending on an arrangement pitch p of pixels is represented by expression (1) below.

$$fn = 1/2p \qquad (1)$$

Therefore, as the distance p between pixels increases, the Nyquist frequency fn decreases and patterns having a spatial frequency equal to or higher than the Nyquist frequency fn relatively increase. Thus, aliasing noise increases.

The increase in the distance p between pixels at the time when the pixel skipping ratio is increased will be explained with reference to pixels arrangements shown in FIGS. 30A to 30C. In FIGS. 30A to 30C, shaded pixels are pixels to be read out in a pixel skipping process. In FIG. 30A, a pixel arrangement at the time when all pixels are read out is shown. A distance between pixels is the same as a pixel width. In FIG. 30B, an example of a pixel arrangement at the time when pixel information is skipped at a ratio of 1/9 is shown. A distance between pixels to be read out is increased to a distance equivalent to three pixels. In FIG. 30C, an example of a pixel arrangement at the time when pixel information is skipped at a ratio of 1/25 is shown. A distance between pixels to be read out is increased to a distance equivalent to five pixels. It is seen that, when the pixel skipping ratio is increased, a distance between pixels increases, and aliasing noise increases following a decrease in the Nyquist frequency, affecting images significantly.

In the second conventional technique described in the patent document 2, when the pixel skipping processing is performed in the procedure described above, shaded pixels are pixels to be read out in FIG. 31. Consequently, for example, there are two kinds (A and B) of intervals between pixels to be read out. Since the pixels have a different spatial frequency for each pixel pitch, aliasing noise increases and a false color occurs. In the process of performing the pixel skipping processing in this way, there is a significant problem in that aliasing noise increases and false colors increase.

In short, at the time of the pixel skipping and readout, when pixels are simply skipped to be read while keeping both an order of pixel information and a spatial positional relation the same as those in all-pixel readout such that the same color arrangement of pixels is obtained, since a distance between pixels to be read out increases, the Nyquist frequency depending on an arrangement pitch decreases. Thus, patterns having a spatial frequency equal to or higher than the Nyquist frequency relatively increase, resulting in an increase in aliasing noise. In addition, in the pixel skipping and readout method in which pixels to be read out have two or more distances between pixels, since the pixels have a different spatial frequency for each pitch, aliasing noise increases.

The invention has been devised in view of the problems described above and it is an object of the invention to provide a solid state imaging apparatus and a driving method therefor that make it possible to reduce aliasing noise by increasing a pixel area simulatively.

DISCLOSURE OF THE INVENTION

A solid state imaging apparatus according to the invention is characterized by including: an X-Y addressable solid state imaging apparatus in which pixels are arranged in a matrix shape and color filters having predetermined color coding are formed in the respective pixels; and driving means that, in a process of pixel skipping to read out pixel information from the solid state imaging apparatus, with a pixel block consisting of plural pixels adjacent to one another in a row direction and a column direction set as a unit pixel block, reads out pixel information of a same color filter in the unit pixel block as pixel information for one pixel simulatively.

A driving method for a solid state imaging apparatus according to the invention is characterized by, in a solid state imaging apparatus using an X-Y addressable solid state imaging apparatus in which pixels are arranged in a matrix shape and color filters having predetermined color coding are formed in the respective pixels, in a process of skipping to read out pixel information from the solid state imaging apparatus, with a pixel block consisting of plural pixels adjacent to one another in a row direction and a column direction set as a unit pixel block, reading out pixel information of a same color filter in the unit pixel block as pixel information for one pixel simulatively.

In the solid state imaging apparatus or the driving method therefor with the constitution described above, at the time of pixel skipping and readout, pixel information of a same color filter in the unit pixel block is outputted as pixel information for one pixel simulatively, whereby a distance between pixels increases simulatively and a pixel area increases simulatively. Consequently, an MTF value falls in a spatial frequency domain equal to or higher than the Nyquist frequency. As a result, aliasing noise decreases.

BRIEF DESCRIPTION OF THE DRAWINGS

FIG. 2A shows a case of a conventional example and FIG. 2B shows a case of the first embodiment;

FIG. 3 is a diagram for explaining an operation at the time when an amount of pixel information is compressed at a ratio of 1/25.

FIGS. 5A and 5B are diagrams showing an example of a method of skipping and adding pieces of pixel information without shifting a center of gravity from a unit pixel block.

FIG. 6 is a diagram showing a method of skipping and adding pieces of pixel information at the time when it is desired to reduce, in particular, aliasing noise due to a spatial frequency in a horizontal direction.

FIGS. 7A and 7B are diagrams for explaining an operation in the case of a pixel arrangement of color filters that have, with four rows and four columns as a unit, color coding of repetition of the unit.

FIGS. 8A to 8E are diagrams for explaining an operation in a first specific example (an amount of pixel information is compressed at a ratio of 1/4) of a second embodiment.

FIG. 9 is a diagram showing a processing result in the first specific example of the second embodiment.

FIGS. 10A to 10E are diagrams for explaining an operation in a second specific example (an amount of pixel information is compressed at a ratio of 1/9) of the second embodiment.

FIG. 11 is a diagram showing a processing result in the second specific example of the second embodiment.

FIGS. 12A to 12D are diagrams for explaining an operation in a third specific example (an amount of pixel information is compressed at a ratio of 1/16) of the second embodiment.

FIG. 13 is a diagram showing a processing result in the third specific example of the second embodiment.

FIGS. 14A to 14D are diagrams for explaining an operation in a fourth specific example (an amount of pixel information is compressed at a ratio of 1/25) of the second embodiment.

FIG. 15 is a diagram showing a processing result in the fourth specific example of the second embodiment.

FIGS. 16A to 16D are diagrams for explaining an operation of a modification (sixteen pixels are skipped and added and an amount of pixel information is compressed at a ratio of 1/25) of the second embodiment.

FIG. 17 is a diagram showing a processing result in the modification of the second embodiment.

FIG. 19 is a diagram for explaining an operation in the third embodiment.

FIG. 20 is a diagram showing another method of skipping and adding pieces of pixel information in the third embodiment.

FIGS. 23A to 23E are diagrams for explaining an operation in a fourth embodiment.

FIG. 24 is a diagram showing a processing result in the fourth embodiment.

FIGS. 26A to 26E are diagrams for explaining an operation in a first specific example (an amount of pixel information is compressed at a ratio of 1/9) of the fourth embodiment.

FIG. 27 is a diagram showing a processing result in the fourth embodiment.

FIGS. 28A to 28D are diagrams for explaining an operation in a second specific example (an amount of pixel information is compressed at a ratio of 1/16) in the fourth embodiment.

FIG. 29 is a diagram showing a processing result in the fourth embodiment.

BEST MODE FOR CARRYING OUT THE INVENTION

Embodiments of the invention will be hereinafter explained in detail with reference to the drawings.

FIRST EMBODIMENT

Figure 1:
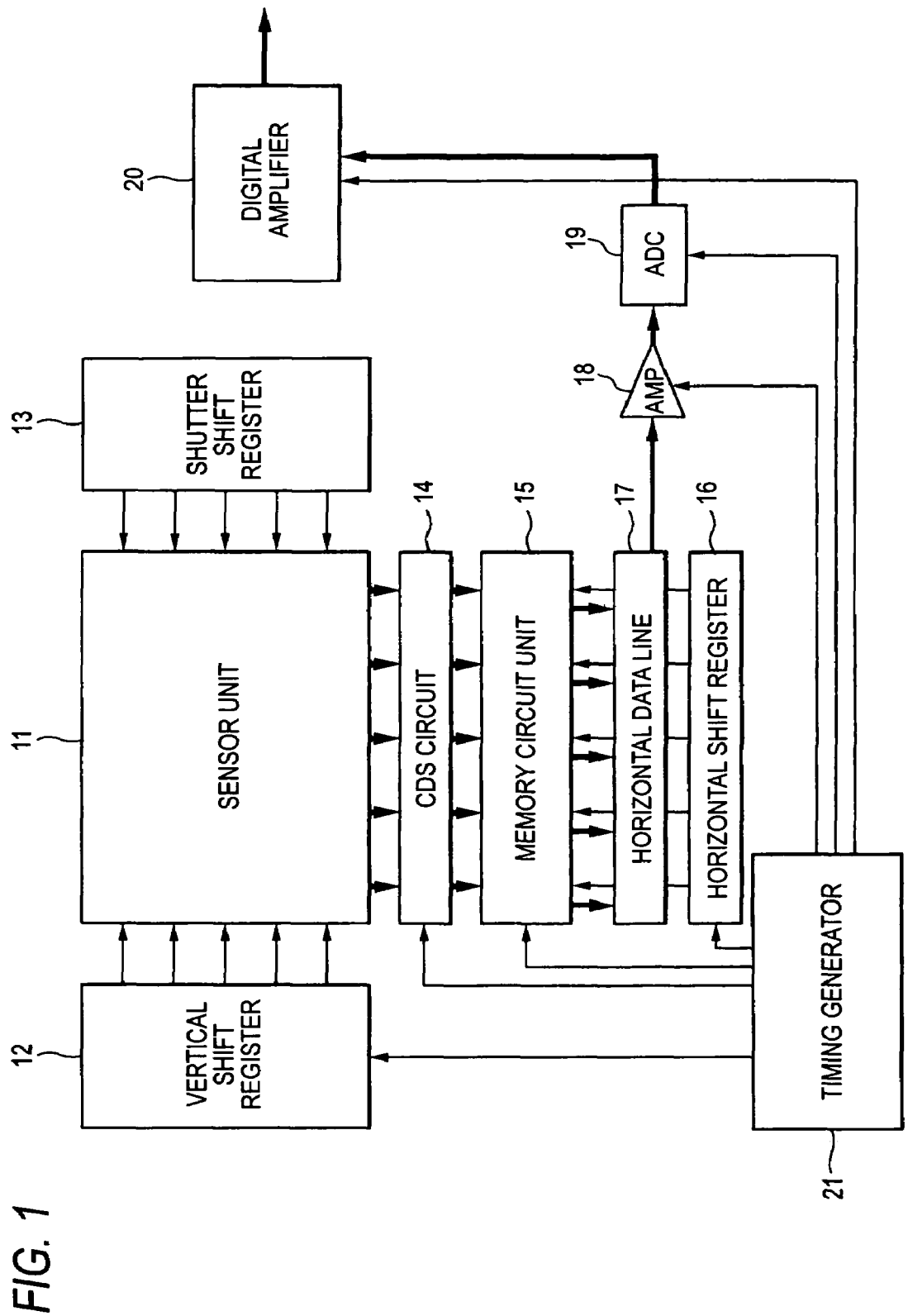
FIG. 1 is a block diagram showing an example of a constitution of a solid state imaging apparatus according to a first embodiment of the invention.

FIG. 1 is a block diagram showing an example of a constitution of a solid state imaging apparatus according to a first embodiment of the invention. In an example explained in this embodiment, an X-Y addressable solid state imaging apparatus of a type for reading out information of pixels for one row simultaneously, for example, a CMOS image sensor is used as a solid state imaging apparatus.

As shown in FIG. 1, the solid state imaging apparatus according to this embodiment includes a sensor unit 11, a vertical shift register 12, a shutter shift register 13, a CDS (Correlated Double Sampling) circuit 14, a memory circuit unit 15, a horizontal shift register 16, a horizontal data line 17, an amplifier unit (AMP) 18, an AD converter (ADC) 19, a digital amplifier 20, and a timing generator 21.

The sensor unit 11 has a constitution in which pixels are arranged in a matrix shape and row selection lines, shutter lines, vertical data lines, and the like are wired with respect to the pixel arrangement. Note that, although not shown in the figure, color filters having predetermined color coding are formed in the respective pixels in the sensor unit 11. A specific example of the color coding will be described later. The respective pixels of the sensor unit 11 are constituted by photoelectric conversion elements and transistor circuits. The vertical shift register 12 is a shift register for selecting the respective pixels by a unit of row in reading out pixel information from the sensor unit 11. The vertical shift register 12 constitutes signal output row selecting means together with driver circuits (not shown) of respective rows. The shutter shift register 13 is a shift register for selecting the respective pixels by a unit of row in performing an electronic shutter operation. The shutter shift register 13 constitutes electronic shutter row selecting means together with the driving circuits (not shown) of the respective rows.

The CDS circuit 14 is a kind of noise removing means. The CDS circuit 14 is provided for each pixel row of the sensor unit 11. The CDS circuit 14 calculates a difference between a signal level from pixels and a 0 level after resetting photoelectric conversion elements and removes fixed fluctuation for each pixel. The memory circuit unit 15 stores pixel information sent through the CDS circuit 14. It is assumed here that a memory capacity of the memory circuit unit 15 does not matter. The horizontal shift register 16 has a function as selecting means for selecting the pixel information stored in the memory circuit unit 15 and outputting the selected pixel information to the horizontal data line 17.

The amplifier unit 18 amplifies signals of the respective pixels, which are outputted from the CMOS image sensor through the horizontal data line 17, with an appropriate gain. The A/D converter 19 converts an analog signal amplified by the amplifier unit 18 into a digital signal. The digital amplifier 20 amplifies the digital signal outputted from the A/D converter 19 appropriately and outputs the amplified digital signal. The timing generator 21 generates various timing signals that are used in the vertical shift register 12, the shutter shift register 13, the CDS circuit 14, the memory circuit unit 15, the horizontal shift register 16, the amplifier unit 18, the A/D converter 19, and the digital amplifier 20.

In the solid state imaging apparatus having the constitution described above, a CMOS image sensor of a type for selecting respective pixels of the sensor unit 11 by a unit of row and reading out information of pixels for the selected one row simultaneously is constituted by the vertical shift register 12, the shutter shift register 13, and the timing generator 21 for driving the vertical shift register 12 and the shutter shift register 13. The memory circuit unit 15, the horizontal shift register 16, the horizontal data line 17, and the timing generator 21 for driving the memory circuit unit 15, the horizontal shift register 16, and the horizontal data line 17 constitute driving means that, in a process of skipping and reading out pixel information from the sensor unit 11, with a pixel block consisting of plural pixels adjacent to one another in a row direction and a column direction set as a unit pixel block, reads out pixel information of a same color filter in the unit pixel block as pixel information for one pixel simulatively.

Next, operations of the solid state imaging apparatus according to this embodiment having the constitution described above will be explained. In reading out pixel information from the sensor unit 11, when a pixel row to be a signal output object (hereinafter referred to as "signal output row") is selected by the vertical shift register 12, in the respective pixels of the selected signal output row, a signal level corresponding to electrons, which are photoelectrically converted by photoelectric conversion elements and accumulated, and a 0 level after resetting the photoelectric conversion elements are outputted to the CDS circuit 14 for each column.

In performing an electronic shutter operation, when a pixel row to be an electronic shutter object (hereinafter referred to as "electronic shutter row") is selected by the shutter shift register 13, photoelectric conversion elements of respective pixels of the selected electronic shutter row are reset. Immediately after the vertical shift register 12 drives the signal output row, the shutter shift register 13 operates with the same driving pulse as the vertical shift register 12. Signals of the respective pixels of the electronic shutter row and the signal output row are captured by the CDS circuit 14.

When the electronic shutter row and the signal output row move while keeping a fixed interval between the rows, signals of pixels outputted from the signal output row change to signals of light that is photoelectrically converted by the photoelectric conversion elements while the light travels from the electronic shutter row to the signal output row. Therefore, it is possible to change time of irradiation on the photoelectric conversion elements (charge accumulating time) by adjusting the interval between the electronic shutter row and the signal output row.

The driving pulse for the vertical shift register 12 and the shutter shift register 13 is generated by the timing generator 21. Therefore, adjustment of the charge accumulating time can be realized by adjusting a timing relation of respective driving pulses generated by the timing generator 21.

At the time of the all-pixel readout, respective operations of the electronic shutter and the readout are applied to all rows from a first row to a last row or a pixel row near the last row. Read out pixel information is stored in the memory circuit unit 15. It is possible to output plural pieces of arbitrary pixel information from the memory circuit unit 15 to the horizontal data line 17 at arbitrary timing and read out the pixel information. These operations are publicly-known operations same as those in the case of the general CMOS image sensor.

Subsequently, a pixel skipping and readout operation, which is a characteristic part of the solid state imaging apparatus according to this embodiment, will be explained. In a constitution adopted in the solid state imaging apparatus according to this embodiment, in the pixel skipping and readout process, with a pixel block consisting of plural pixels adjacent to one another in a row direction and a column direction set as one unit, pixel information of a same color filter present in the unit pixel block is read out as information for one pixel in a state in which the unit pixel blocks are laid without overlapping one another, whereby a pixel size is increased simulatively to fix an interval of pixels to be read out. An MTF (Modulation Transfer Function) value of a spatial frequency domain equal to or higher than the Nyquist frequency is reduced while keeping an order of pixel information and a spatial positional relation the same as those in the all-pixel readout, whereby aliasing noise is reduced.

Figure 2B:
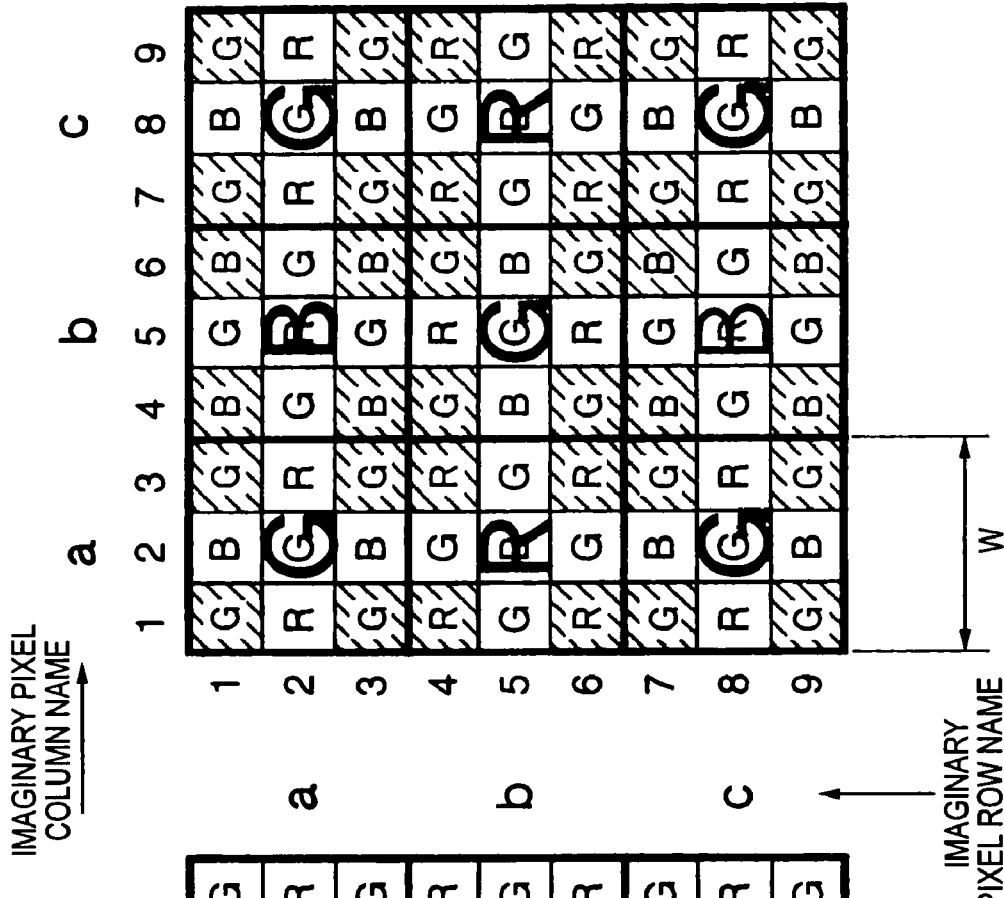
FIGS. 2A and 2B are diagrams for explaining an operation at the time when an amount of pixel information is compressed at a ratio of 1/9.
Figure 2A:
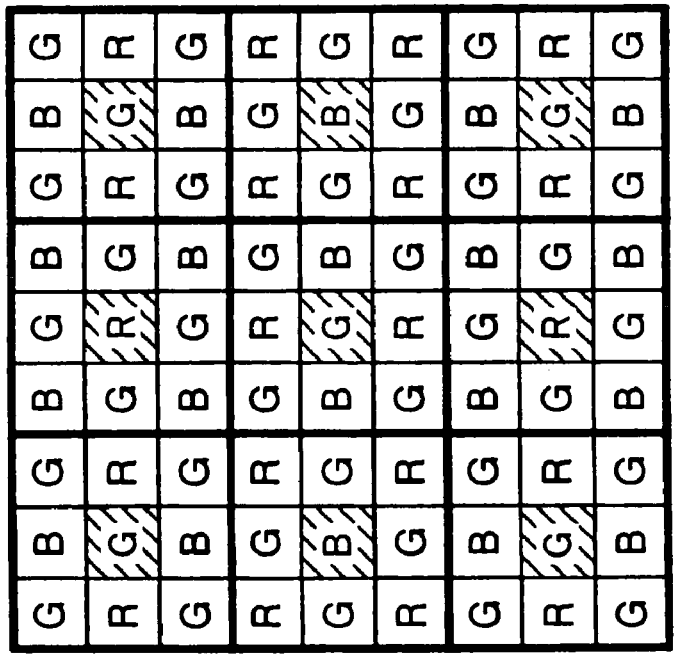

A specific method (a driving method) for the pixel skipping and readout processing will be explained with reference to FIGS. 2A and 2B. FIG. 2A is a diagram schematically showing, as an arrangement of pixels, an example of a case of the conventional pixel skipping and readout at the time when an amount of pixel information is compressed at a ratio of 1/9. FIG. 2B is a diagram schematically showing, as an arrangement of pixels, an example of a case of the pixel skipping and readout according to this embodiment at the time when an amount of pixel information is compressed at a ratio of 1/9.

In the conventional pixel skipping and readout processing, as shown in FIG. 2A, respective pieces of pixel information in second, fifth, eighth, . . . columns of a second row are simply read out in order. When pixels to be read out reach a last column or a column near the last column (a column from which pixel information is read out and subjected to the pixel skipping and addition processing last is changed by setting), then, respective pieces of pixel information in second, fifth, eighth, . . . columns of a fifth row are read out in order. Subsequently, the same operation is repeated. In this way, when the pixel skipping operation is performed at the compression ratio of 1/9, as described above, a distance between pixels to be read out increases. Thus, the Nyquist frequency decreases and a spatial frequency equal to or higher than the Nyquist frequency increases relatively following the decrease in the Nyquist frequency. As a result, aliasing noise increases.

If a pitch width of pixels to be read out is reduced to increase the Nyquist frequency or an MTF value of an area of a frequency equal to or higher than the Nyquist frequency is decreased, it is possible to reduce aliasing noise. When a pixel width is set as X and a spatial frequency is set as $\omega$, an MTF value is represented by expression (2) below. The MTF value decreases as a pixel area increases.

$$MTF = \{\sin(\omega X/2)\}/(\omega X/2) \quad (2)$$

Thus, in order to reduce aliasing noise, in the solid state imaging apparatus according to this embodiment, as shown in FIG. 2B, with two rows and two columns as a unit, color filers having color coding of repetition of the unit are arranged in a pixel arrangement. In the pixel arrangement, in compressing an amount of pixel information at a ratio of, for example, 1/9, 3×3 pixel blocks are set as unit pixel blocks (in the figure, blocks surrounded by bold lines on four sides). Note that, for convenience of explanation, imaginary pixel row names a, b, c, and so on and imaginary pixel column names a, b, c, and so on are attached to the arrangement of the unit pixel blocks.

First of all, all pieces of pixel information of a same color filter (in the figure, shaded parts) in first and third columns of a first row and the first and the third columns of a third row, that is, all pieces of pixel information of a same color, G (green) in this embodiment, in pixels blocks in an ath row and an ath column are added and outputted as information for one pixel. This processing for adding pieces of pixel information of a same color in a unit pixel block can be realized by reading out these pieces of pixel information from the memory circuit unit 15 to the horizontal data line 17 simultaneously. Next, all pieces of pixel information of a same color filter in fourth and sixth columns of the first row and the fourth and the sixth columns of the third row, that is, all pieces of image information of a same color, B (blue) in this embodiment, in pixels blocks in the ath row and a bth column are added and outputted as information for one pixel. Subsequently, the same operation is repeated for the ath row by a unit of a pixel block.

When pixels to be read out reach a last column or a column near the last column in the ath row (a column from which pixel information is read out and subjected to the pixel skipping and adding processing last is changed by setting), three stages below, all pieces of pixel information of a same color filter in the first and the third columns of a fourth row and the first and the third columns of a sixth row, that is, all pieces of image information of a same color, R (red) in this embodiment, in pixel blocks in a bth row and the ath column are added and outputted as information for one pixel. Subsequently, all pieces of pixel information of a same color filter in the fourth and the sixth columns of the fourth row and the fourth and the sixth columns of the third row, that is, all pieces of image information of a same color, G in this embodiment, in pixel blocks in the bth row and the bth column are added and outputted as information for one pixel. Subsequently, the same operation is repeated for the bth row by a unit of a pixel block.

The same operation is repeatedly applied to pixel information in a last row or a row near the last row. By performing the pixel skipping and readout processing according to such an operation, it is possible to increase a pixel area simulatively and reduce an MTF value of a spatial frequency domain equal to or higher than the Nyquist frequency. Thus, it is possible to reduce aliasing noise.

In the pixel skipping and readout processing described above, the 3×3 pixel block is set as a unit pixel block as an example. The invention is not limited to this. A pixel block represented as (2k+3)×(2k+3) (k is a positive integer equal to or larger than 0) in a general expression is set as a unit pixel block and all pieces of pixel information of a same color in the unit block are added. This makes it possible to increase a pixel area simulatively and skip pixel information while reducing an MTF value of a spatial frequency domain equal to or higher than the Nyquist frequency and keeping both an order of pixel information and a spatial positional relation the same as those in the all-pixel readout.

Figure 3:
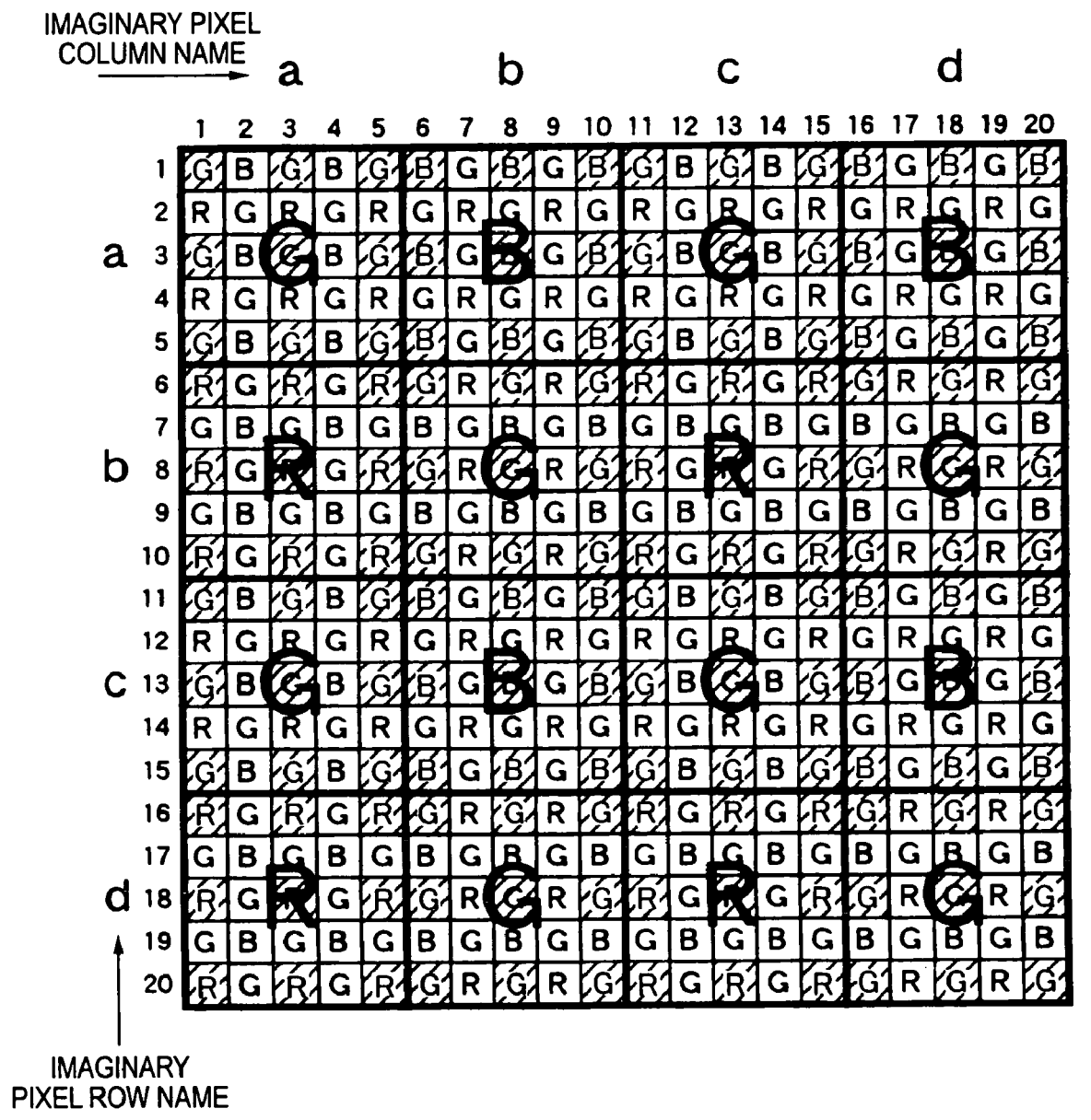

When k=1, as shown in FIG. 3, a 5×5 pixel block is set as a unit pixel block and pieces of pixel information in first, third, and fifth columns of first, third, and fifth rows of a pixel arrangement are added and outputted as an output in an ath row and an ath column of the unit pixel block. Subsequently, pieces of pixel information in sixth, eighth, and tenth columns of the first, the third, and the fifth rows of the pixel arrangement are added and outputted as an output in the ath row and a bth column of the unit pixel block. Subsequently, pieces of pixel information are added and outputted up to a last column or a column near the last column (a column from which pixel information is read out and subjected to the pixel skipping and adding processing last is changed by setting). Thereafter, pieces of pixel information in the first, the third, and the fifth columns of the sixth, the eighth, and the tenth rows of the pixel arrangement are added and outputted as an output in a bth row and the ath column of the unit pixel block. Subsequently, all arbitrary pixels are read out while repeating the same operation and skipping and adding pieces of pixel information. Consequently, a result of compression of an amount of pixel information at a ratio of 1/25 is obtained.

Figure 4:
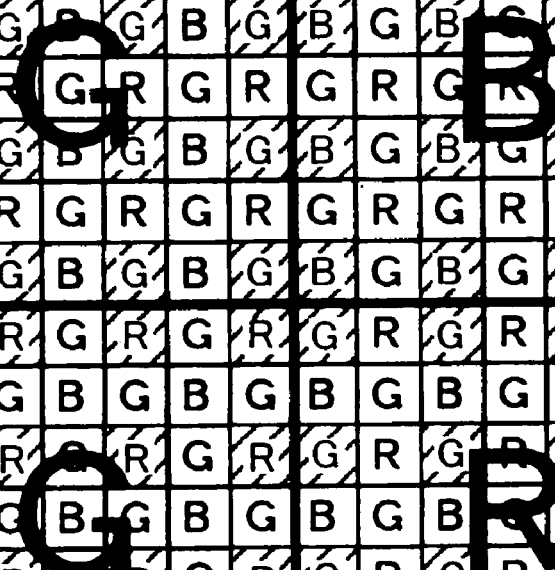
FIG. 4 is a diagram for explaining an operation at the time when an amount of pixel information is compressed at a ratio of 1/49.

When k=2, as shown in FIG. 4, a 7×7 pixel block is set as a unit pixel block and pieces of pixel information in first, third, fifth, and seventh columns of first, third, fifth, and seventh rows of a pixel arrangement are added and outputted as an output in an ath row and an ath column of the unit pixel block. Then, pieces of pixel information in eighth, tenth, twelfth, and fourteenth columns of the first, the third, the fifth, and the seventh rows of the pixel arrangement are added and outputted as an output in the ath row and a bth column of the unit pixel block. Subsequently, pieces of pixel information are added and outputted up to a last column or a column near the last column (a column from which pixel information is read out and subjected to the pixel skipping and adding processing last is changed by setting). Thereafter, pieces of pixel information in the first, the third, the fifth, and the seventh columns of the eighth, the tenth, the twelfth, and the fourteenth rows of the pixel arrangement are added and outputted as an output in a bth row and the ath column of the unit pixel block. Subsequently, all arbitrary pixels are read out while repeating the same operation and skipping and adding pixels. Consequently, a result of compression of an amount of pixel information at a ratio of 1/49 is obtained.

Subsequently, in the same manner, pixel blocks given by k=3, 4, . . . are set as unit pixel blocks and all pieces of image information of same colors in the unit pixel blocks are added and skipped and read out. Consequently, it is possible to reduce aliasing noise.

Figures 5A, 5B:
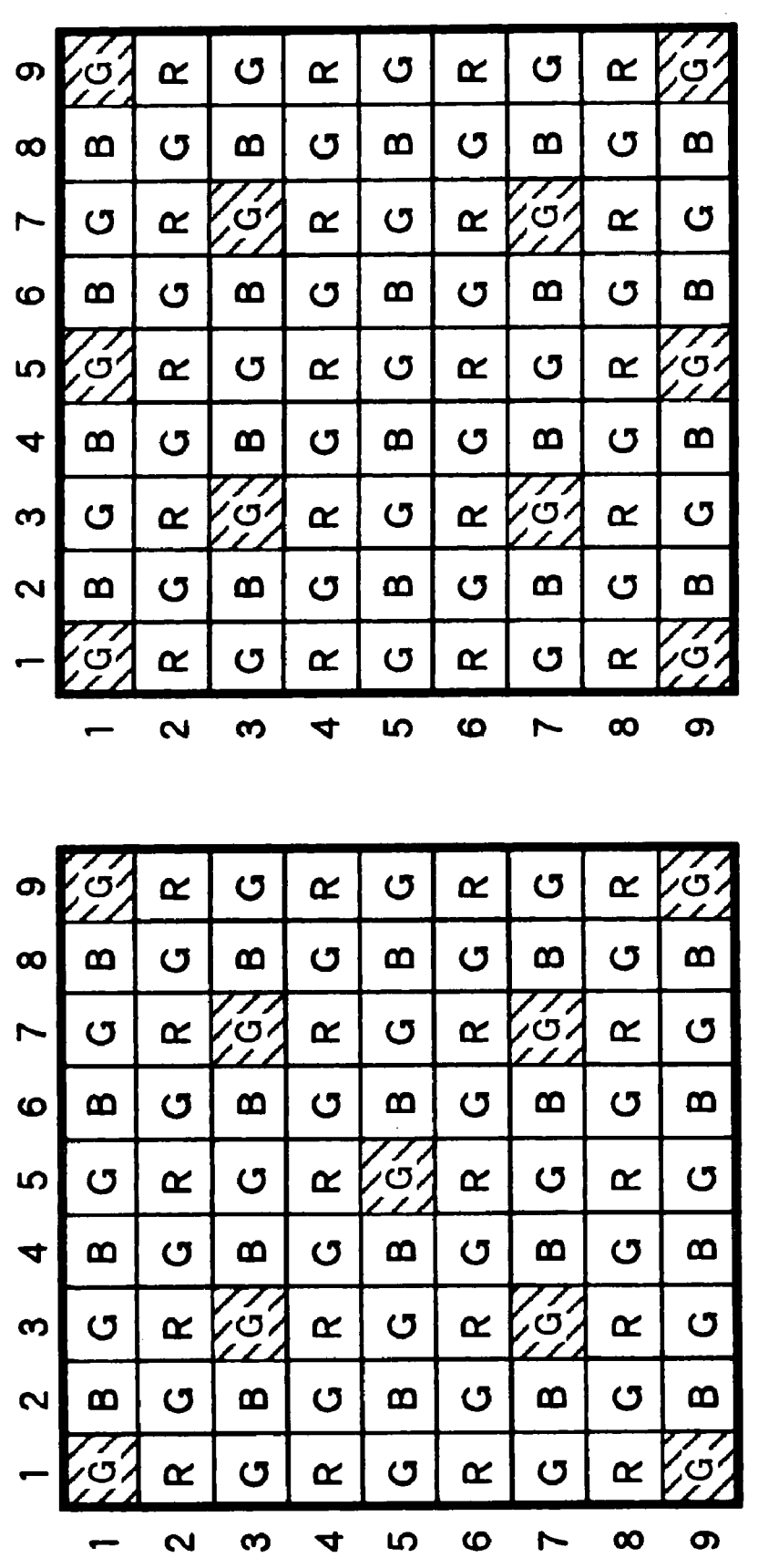

As a method of reading out pixel information so as not to destroy a center of gravity of a unit pixel block and skipping and adding the pieces of pixel information, several ways are possible. Specifically, for example, when k=3, as shown in FIG. 5A, respective pieces of pixel information in first and ninth columns of first and ninth rows, third and seventh columns of third and seventh rows, and a fifth column of a fifth row of a pixel arrangement are added and outputted as an output of 9×9 unit pixel block. For the other unit pixel blocks, all arbitrary pixels are read out while the same operation is repeated to skip and add all pieces of pixel information. In addition, as shown in FIG. 5B, respective pieces of pixel information in first, fifth, and ninth columns of first and ninth rows and third and seventh columns of third and seventh rows of a pixel arrangement are added and outputted as an output of a unit pixel block. For the other unit pixel blocks, all arbitrary pixels are read out while the same operation is repeated to skip and add pixels.

A method shown in FIG. 6 is a method of skipping and adding pieces of pixel information that is possible when it is desired to reduce, in particular, aliasing noise due to a spatial frequency in a horizontal direction (a column arrangement direction). In the method, a pixel area in the horizontal direction is increased simulatively.

Specifically, a 3×3 pixel block is set as a unit pixel block simulatively and pieces of pixel information in first and third columns of a second row are added and outputted as an output in an ath row and an ath column of this unit pixel block. Next, pieces of pixel information in fourth and sixth columns of the second row are added and outputted as an output in an ath row and a bth column thereof. Subsequently, pieces of pixel information are added and outputted up to a last column or a column near the last column (a column from which pixel information is read out and subjected to the pixel skipping and adding processing last is changed by setting). Thereafter, pieces of pixel information in the first and the third columns of a fifth row are added and outputted as an output in a bth row and the ath column of the unit pixel block. Subsequently, all arbitrary pixels are read out while repeating the same operation in the respective unit pixel blocks and skipping and adding pixels.

According to the pixel skipping and adding processing described above, it is possible to increase a pixel area in the horizontal direction simulatively. Thus, it is possible to reduce aliasing noise due to a spatial frequency in the horizontal direction. It is needless to mention that, in a vertical direction (a row arrangement direction), it is also possible to reduce aliasing noise by performing the pixel skipping processing with the same idea.

In the above explanation, with two rows and two columns set as a unit, the pixel skipping and readout processing is applied to a pixel arrangement in which color filters having color coding of repetition of the unit (repetition of vertical 2×horizontal 2) are arranged. However, the invention is not limited to this. A method of, assuming that a certain unit pixel block is one pixel, adding pieces of pixel information of a same color filter in the unit pixel block to increase a pixel area (a pixel width) simulatively and reduce aliasing noise at the time of the pixel skipping processing is effective in every color filter arrangement having color coding.

As another pixel arrangement of a color filter having color coding, for example, it is also possible to provide a pixel arrangement of a color filter that have, with four rows and four columns as a unit, color coding of a G stripe system, which is color coding of repetition of the unit. In the case of this pixel arrangement, again, with a pixel block of (2k+3)×(2k+3) (k is a positive integer equal to or larger than 0) set as a unit pixel block, pixel information of same color filters in respective unit pixel blocks only has to be read out as pixel information for one pixel simulatively in a state in which the unit pixel blocks are laid to overlap one another.

Figures 7A, 7B:
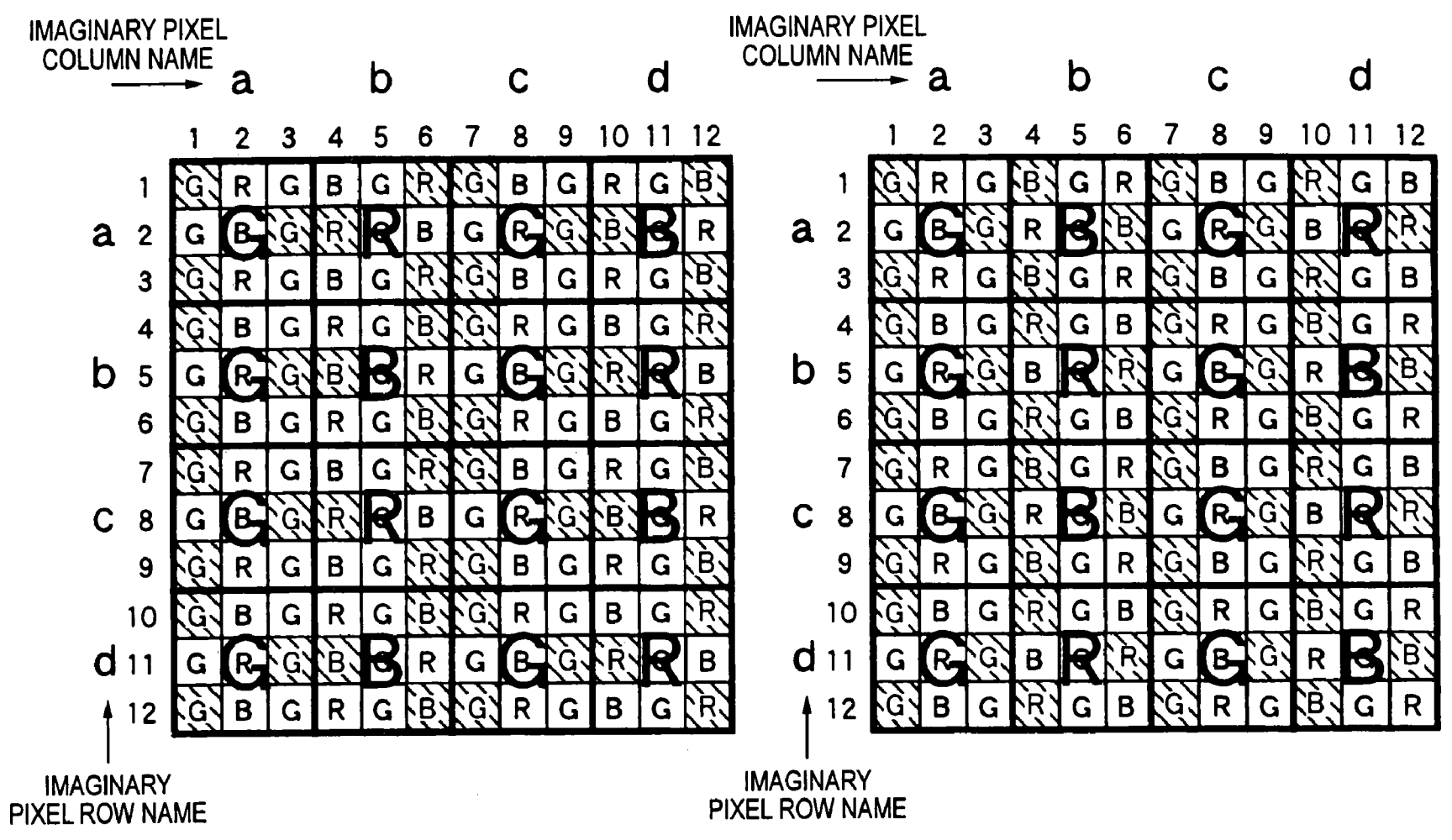

Specifically, for example, when k=0, as shown in FIG. 7A, pieces of pixel information in a first column of first and third rows and a third column of a second row of a pixel arrangement are added and outputted as an output in an ath row and an ath column of a unit pixel block. Then, pieces of pixel information in a sixth column of the first and the third row and a fourth column of the second row of the pixel arrangement are added and outputted as an output in the ath row and a bth column of the unit pixel block. Subsequently, pieces of pixel information are added and outputted up to a last column or a column near the last column (a column from which pixel information is read out and subjected to the pixel skipping and adding processing last is changed by setting). Thereafter, pieces of pixel information in the first column of fourth and sixth rows and the third column of a fifth row of the pixel arrangement are added and outputted as an output in a bth row and the ath column of the unit pixel block. Then, pieces of pixel information in the sixth column of the fourth and the sixth rows and the fourth column of the fifth row of the pixel arrangement are added and outputted as an output in a bth row and the bth column of the unit pixel block. Subsequently, all arbitrary pixels only have to be read out while repeating the same operation and skipping and adding pixels.

As shown in FIG. 7B, pieces of pixel information in a first column of first and third rows and a third column of a second row of a pixel arrangement are added and outputted as an output in an ath row and an ath column of a unit pixel block. Then, pieces of pixel information in a fourth column of the first and the third row and a sixth column of the second row of the pixel arrangement are added and outputted as an output in the ath row and a bth column of the unit pixel block. Subsequently, pieces of pixel information are added and outputted up to a last column or a column near the last column (a column from which pixel information is read out and subjected to the pixel skipping and adding processing last is changed by setting). Thereafter, pieces of pixel information in the first column of fourth and sixth rows and the third column of a fifth row of the pixel arrangement are added and outputted as an output in a bth row and the ath column of the unit pixel block.

Then, pieces of pixel information in the fourth column of the fourth and the sixth rows and the sixth column of the fifth row of the pixel arrangement are added and outputted as an output in the bth row and the bth column of the unit pixel block. Subsequently, all arbitrary pixels only have to be read out while repeating the same operation and skipping and adding pixels.

In this way, in a pixel arrangement of color filters that have, with four rows and four columns set as a unit, color coding of repetition of the unit, as shown in FIGS. 7A and 7B, when the pixel skipping and readout is performed with, for example, a 3×3 unit pixel block, as described above, pieces of pixel information of shaded parts in the unit pixel block are added and outputted as one piece of pixel information. This makes it possible to reduce aliasing noise while keeping both an order of pixel information and a spatial positional relation the same as those in the all pixel reading. In addition, universally, it is possible to reduce aliasing noise by skipping pixel information in the same method in a unit pixel block of (2k+3)×(2k+3) (k is a positive integer equal to or larger than 0) as well.

As described above, assuming that a certain unit pixel block is one pixel, pieces of pixel information of a same color filter in the unit pixel block are added and read out. Consequently, even in the pixel skipping and readout process in which a distance between pixels increases and the Nyquist frequency decreases to increase aliasing noise relatively, it is possible to increase a pixel area (a pixel width) simulatively and reduce an MTF value in a spatial frequency domain equal to or higher than the Nyquist frequency. This makes it possible to reduce aliasing noise. In addition, since it is possible to decrease a driving frequency of a solid state imaging apparatus by reading out pixel information while performing the pixel skipping processing in a sampling process, it is possible to reduce power consumption. Moreover, loads applied on the amplifier unit 18 and the A/D converter 19 in a later stage can be reduced significantly. This makes it possible to compress an amount of pixel information without applying a load to the signal processing system.

SECOND EMBODIMENT

A constitution of a solid state imaging apparatus according to a second embodiment of the invention is basically the same as that of the solid state imaging apparatus according to the first embodiment shown in FIG. 1. However, in the solid state imaging apparatus according to this embodiment, when k is a positive integer equal to or larger than 0, in a process of compressing an amount of pixel information at a ratio of 1/(k+2)×(k+2), (k+2)×(k+2) pixels are skipped and added in a state in which simulative pixel blocks (unit pixel blocks) to be skipped and added are laid to overlap one another, whereby the pixel information is skipped in a state in which aliasing noise is reduced. The solid state imaging apparatus in this embodiment will be explained citing specific examples.

FIRST SPECIFIC EXAMPLE

In a case of a first specific example, k=0, in other words, four (2×2) pixels are skipped and added and an amount of pixel information is compressed at a ratio of 1/4. This case will be explained with reference to diagrams for explaining operations in FIGS. 8A to 9B.

Figures 8A, 8B, 8C:
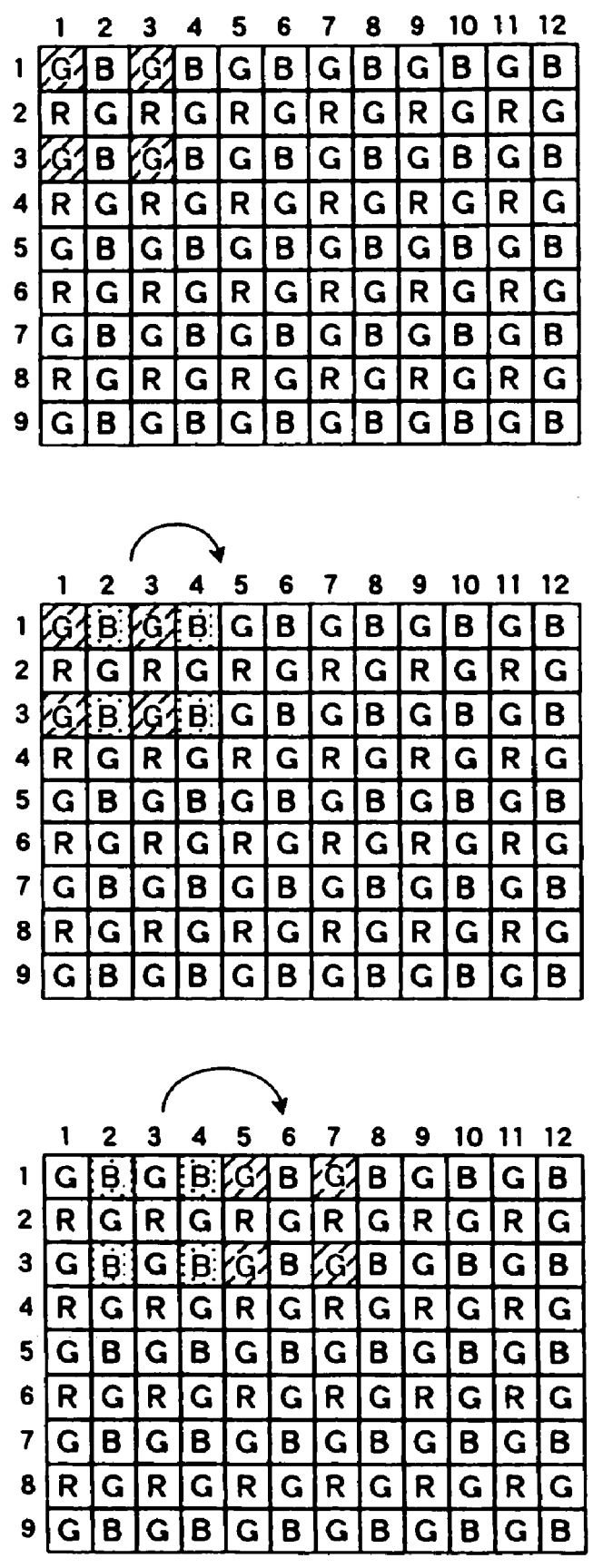

First, as shown in FIG. 8A, all pieces of pixel information of a same color filter in first and third columns of a first row and the first and the third column of a third row, all pieces of pixel information of G in this example, are added and outputted as information for one pixel. Next, as shown in FIG. 8B, all pieces of pixel information of a same color filter in second and fourth columns of the first row and the second and the fourth columns of the third row, all pieces of pixel information of B in this example, are added and outputted as information for one pixel. Then, as shown in FIG. 8C, all pieces of pixel information in fifth and seventh columns of the first row and the fifth and the seventh columns of the third row, all pieces of pixel information of G in this example, are added and outputted as information for one pixel.

Figures 8D, 8E, 9:
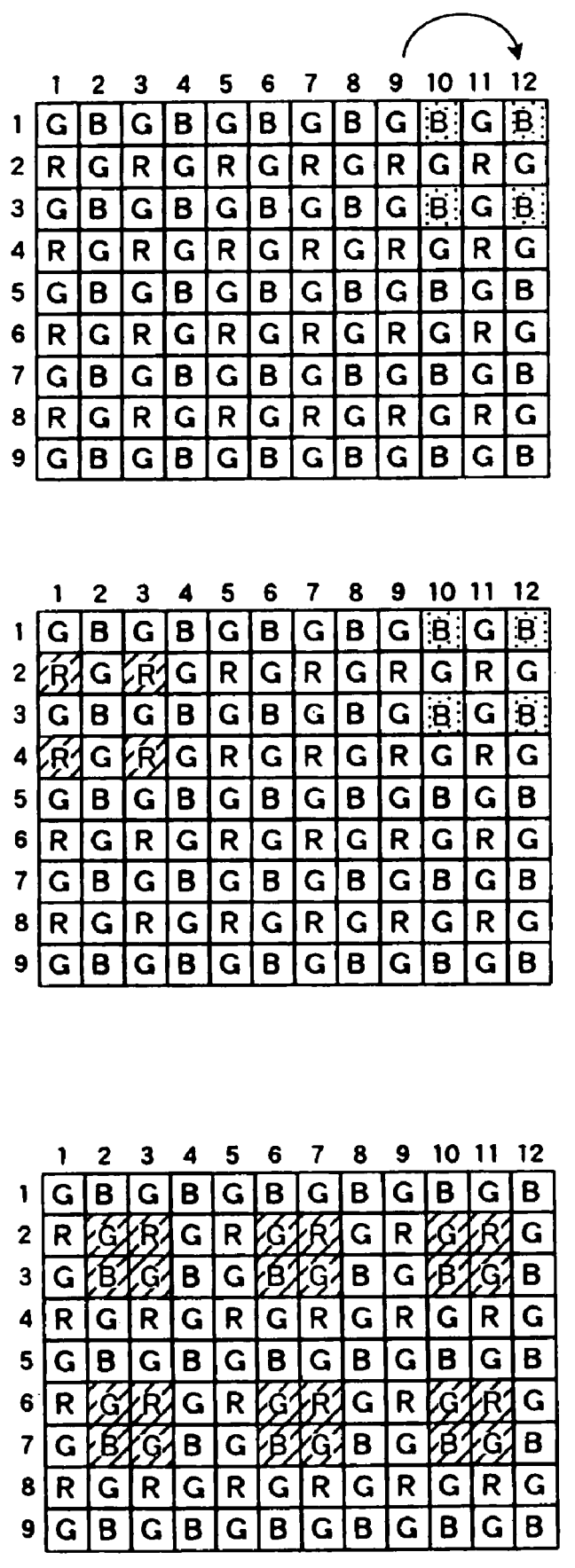

When the same operation is repeated and pixels to be read out reach a last column or a column near the last column as shown in FIG. 8D (a column from which pixel information is read out and subjected to the pixel skipping and adding processing last is changed by setting), as shown in FIG. 8E, one stage below, all pieces of pixel information of a same color filter in the first and the third columns of a second row and the first and the third columns of a fourth row, all pieces of pixel information of R in this example, are added and outputted as information for one pixel. When pixels to be read out reach a last column or a column near the last column in the second row and the fourth row, three stages below, all pieces of pixel information in the first and the third columns of a fifth row and the first and the third columns of a seventh row are added and outputted as information for one pixel. In this way, the same operation is repeated. When pixels to be read out reach a last column or a column near the last column and the operation shifts to a stage below, the same operation is repeated until pixel information in a last row, which is set as one stage below, three stage below, one stage below, three stages below, and so on, or a row near the last row is read out.

In operation A of operation <1>, pieces of pixel information in 4n+1st and 4n+3rd columns of 4m+1st and 4m+3rd rows (m and n are positive integers equal to or larger than 0) are skipped and added to be outputted as information for one pixel. Next, in operation B of the operation <1>, pieces of pixel information in 4n+2nd and 4n+4th columns of the 4m+1st and 4m+3rd rows are skipped and added to be outputted as information for one pixel. Starting the operation from m=0 and n=0, first, m is fixed at 0 and, when a series of operation A and operation B end, n is incremented by 1 before shifting to the next operation A and operation B. Subsequently, in the same manner, the operation A and the operation B are repeated to the end of a column or near the end of the column in order of A, B, A, B, A, B, and so on.

When pixel information is read up to a last column or a column near the last column, next, in operation A of operation <2>, pieces of pixel information in the 4n+1st and the 4n+3rd columns of 4m+2nd and 4m+4th rows are skipped and added to be outputted as information for one pixel. Next, in operation B of the operation <2>, pieces of pixel information in the 4n+2nd and the 4n+4th columns of the 4m+2nd and the 4m+4th rows are skipped and added to be outputted as information for one pixel. Starting the operation from m=0 and n=0, first, m is fixed at 0 and, when a series of operation A and operation B end, n is incremented by 1 before shifting to the next operation A and operation B. Subsequently, in the same manner, the operation A and the operation B are repeated to the end of a column or near the end of the column in order of A, B, A, B, A, B, and so on.

When pixel information is read up to a last column or a column near the last column in this row, a value of m is incremented by 1 and the operation <1> and the operation <2> are performed in the same manner. Then, until all pieces of pixel information set to be read out are read out, with a pair of the operation <1> and the operation <2> as a basic operation, a value of m is incremented by 1 every time the basic operation is performed one cycle. When pieces of pixel information are skipped and added in this way, a simulative center of gravity of pixels is as shown in FIG. 9. This means that, since pixel information of a same color filter is outputted for each 2×2 unit pixel block, an amount of pixel information is compressed at a ratio of 1/4.

SECOND SPECIFIC EXAMPLE

In a case of a second specific example, k=1, in other words, nine (3×3) pixels are skipped and added and an amount of pixel information is compressed at a ratio of 1/9. This case will be explained with reference to diagrams for explaining operations in FIGS. 10A to 10E.

Figures 10A, 10B, 10C:
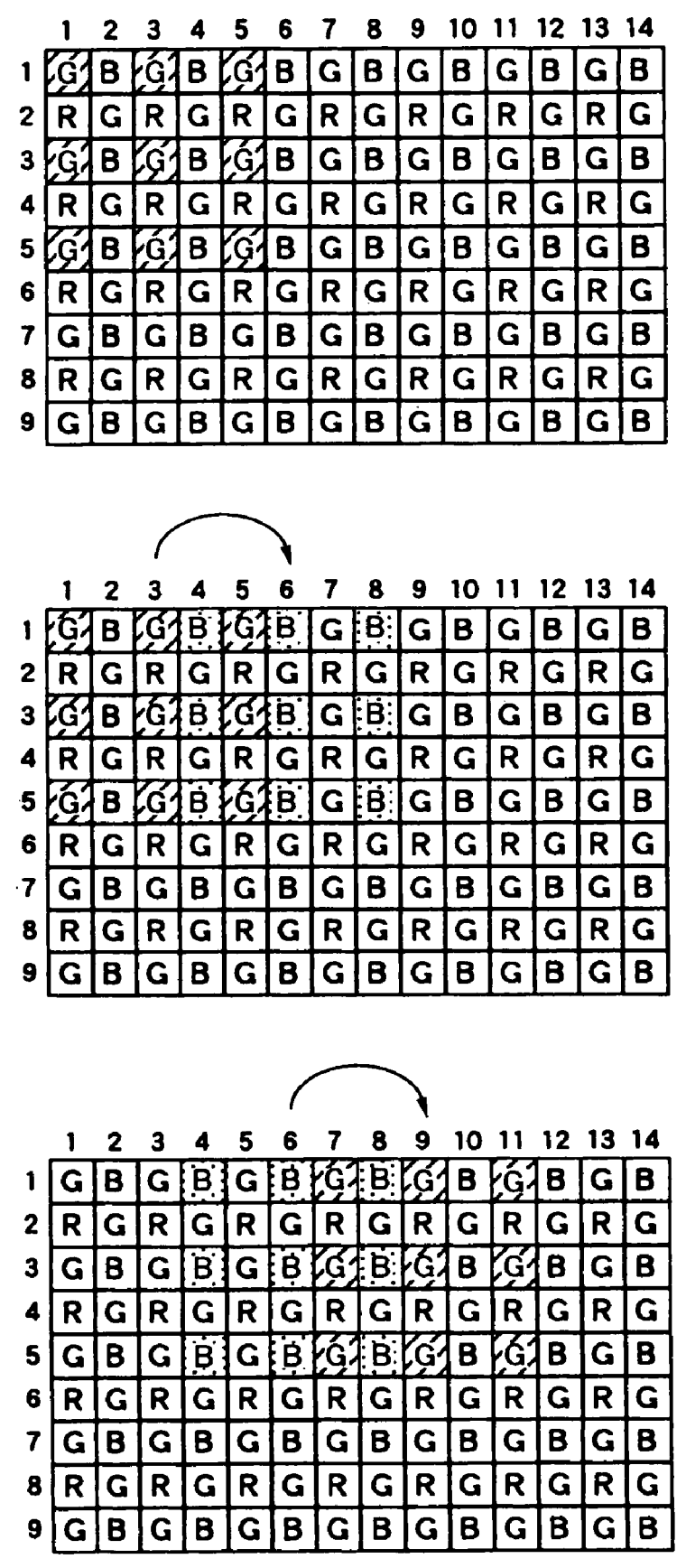

First, as shown in FIG. 10A, pieces of pixel information in first, third, and fifth columns of a first row, the first, the third, and the fifth columns of a third row, and the first, the third, and the fifth columns of a fifth row are added and outputted as information for one pixel. Next, as shown in FIG. 10B, pieces of pixel information in fourth, sixth, and eighth columns of the first row, the fourth, the sixth, and the eighth columns of the third row, and the fourth, the sixth, and the eighth columns of the fifth row are added and outputted as information for one pixel. Similarly, as shown in FIG. 10C, pieces of pixel information in seventh, ninth, and eleventh columns of the first row, the seventh, the ninth, and the eleventh columns of the third row, and the seventh, the ninth, and the eleventh columns of the fifth row are added and outputted as information for one pixel.

Figures 10D, 10E, 11:
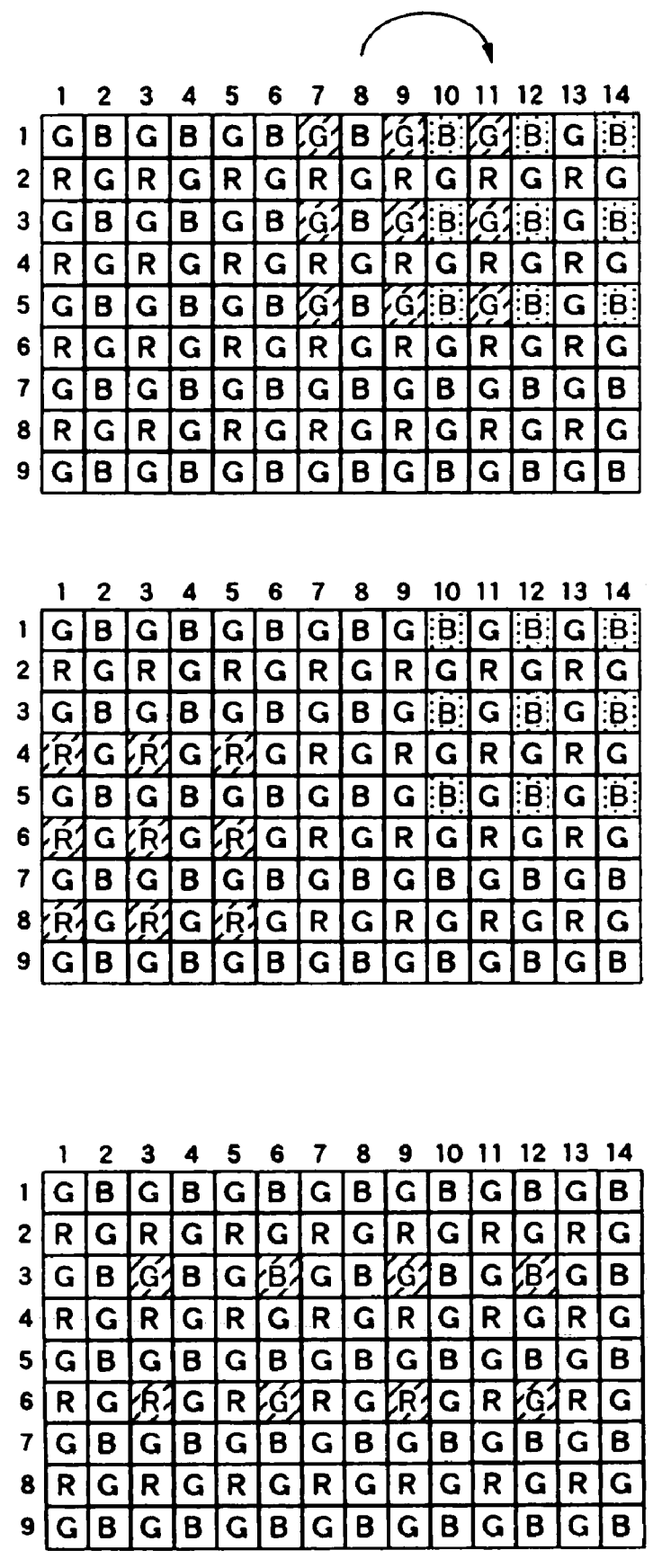

When the same operation is repeated and pixels to be read out reach a last column or a column near the last column as shown in FIG. 10D (a column from which pixel information is read out and subjected to the pixel skipping and adding processing last is changed by setting), as shown in FIG. 10E, three stages below, pieces of pixel information in the first, the third, and the fifth columns of a fourth row, the first, the third, and the fifth columns of a sixth row, and the first, the third, and the fifth columns of an eighth row are added and outputted as information for one pixel.

In operation <1>, pieces of pixel information in 6n+1st, 6n+3rd, and 6n+5th columns of 3m+1st, 3m+3rd, and 3m+5th rows (m and n are positive integers equal to or larger than 0) are skipped and added to be outputted as information for one pixel. Next, in operation <2>, pieces of pixel information in 6n+4th, 6n+6th, and 6n+8th columns of the 3m+1st, the 3m+3rd, and the 3m+5th rows are skipped and added to be outputted as information for one pixel. As a basic operation, the operation <1> and the operation <2> are performed in pair. Starting the operation from m=0 and n=0, first, m is fixed at 0 and n is incremented by 1 every time the basic operation is performed. When pixels to be read reach a last column or a column near the last column, m is incremented by 1 and n is set to 0.

Subsequently, the operation is repeatedly executed until all pieces of the set pixel information are read out in the same manner. When pieces of pixel information are skipped and added in this way, a simulative center of gravity of pixels is as shown in FIG. 11. This means that, since pixel information of a same color filter is outputted for each 3×3 unit pixel block, an amount of pixel information is compressed at a ratio of 1/9.

THIRD SPECIFIC EXAMPLE

In a case of a third specific example, k=2, in other words, sixteen (4×4) pixels are skipped and added and an amount of pixel information is compressed at a ratio of 1/16. This case will be explained with reference to diagrams for explaining operations in FIGS. 12A to 12D.

First, as shown in FIG. 12A, pieces of pixel information in first, third, fifth, and seventh columns of first, third, fifth, and seventh rows are added and outputted as information for one pixel. Next, as shown in FIG. 12B, pieces of pixel information in fourth, sixth, eighth, and tenth columns of the first, the third, the fifth, and the seventh rows are added and outputted as information for one pixel. Similarly, pieces of pixel information in ninth, eleventh, thirteenth, and fifteenth columns of the first, the third, the fifth, and the seventh rows are added and outputted as information for one pixel.

When the same operation is repeated and pixels to be read out reach a last column or a column near the last column as shown in FIG. 12C (a column from which pixel information is read out and subjected to the pixel skipping and adding processing last is changed by setting), as shown in FIG. 12D, three stages below, pieces of pixel information in the first, the third, the fifth, and the seventh columns of fourth, sixth, eighth, and tenth rows are added and outputted as information for one pixel. When pixels to be read out reach a last column or a column near the last column in the fourth, the sixth, the eighth, and the tenth rows, five stages below, the same operation is repeated.

In operation A of operation <1>, pieces of pixel information in 8n+1st, 8n+3rd, 8n+5th, and 8n+7th columns of 8m+1st, 8m+3rd, 8m+5th, and 8m+7th rows (m and n are positive integers equal to or larger than 0) are skipped and added to be outputted as information for one pixel. Next, in operation B of the operation <1>, pieces of pixel information in 8n+4th, 8n+6th, 8n+8th, and 8n+10th columns of the 8m+1st, the 8m+3rd, the 8m+5th, and the 8m+7th rows are skipped and added to be outputted as information for one pixel. A value of m is fixed and, when a series of operation A and operation B end, n is incremented by 1 before shifting to the next operation A and operation B. Subsequently, in the same manner, the operation A and the operation B are repeated to the end of a column or near the end of the column in order of A, B, A, B, A, B, and so on.

When pixel information is read up to a last column or a column near the last column, next, in operation A of operation <2>, pieces of pixel information in the 8n+1st, the 8n+3rd, the 8n+5th, and the 8n+7th columns of the 8m+4th, the 8m+6th, 8m+8th, and 8m+10th rows are skipped and added to be outputted as information for one pixel. Next, in operation B of the operation <2>, pieces of pixel information in the 8n+4th, the 8n+6th, the 8n+8th, and the 8n+10th columns of the 8m+4th, the 8m+6th, the 8m+8th, and the 8m+10th rows are skipped and added to be outputted as information for one pixel. A value of m is fixed and, when a series of operation A and operation B end, n is incremented by 1 before shifting to the next operation A and operation B. Subsequently, in the same manner, the operation A and the operation B are repeated to the end of a column or near the end of the column in order of A, B, A, B, A, B, and so on.

Figure 13:
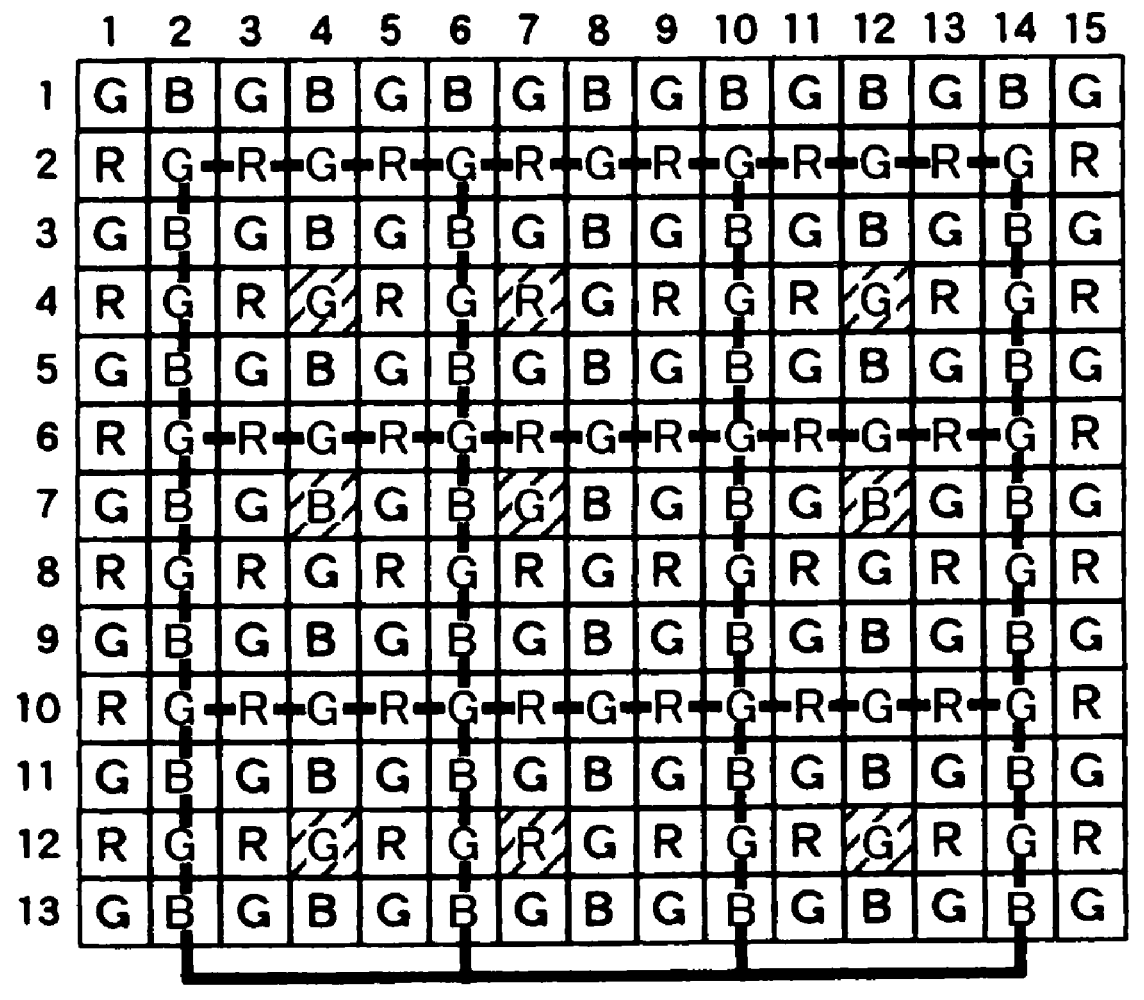

When pixel information is read up to a last column or a column near the last column in this row, a value of m is incremented by 1 and the operation <1> and the operation <2> are performed. Then, until all pieces of pixel information set to be read out are read out, the series of operation described above is repeated. When pieces of pixel information are skipped and added in this way, a simulative center of gravity of pixels is as shown in FIG. 13. This means that, since pixel information of a same color filter is outputted for each 4×4 unit pixel block, an amount of pixel information is compressed at a ratio of 1/16.

FOURTH SPECIFIC EXAMPLE

In a case of a fourth specific example, k=3, in other words, twenty-five (5×5) pixels are skipped and added and an amount of pixel information is compressed at a ratio of 1/25. This case will be explained with reference to diagrams for explaining operations in FIGS. 14A to 14D.

Figures 14A, 14B:
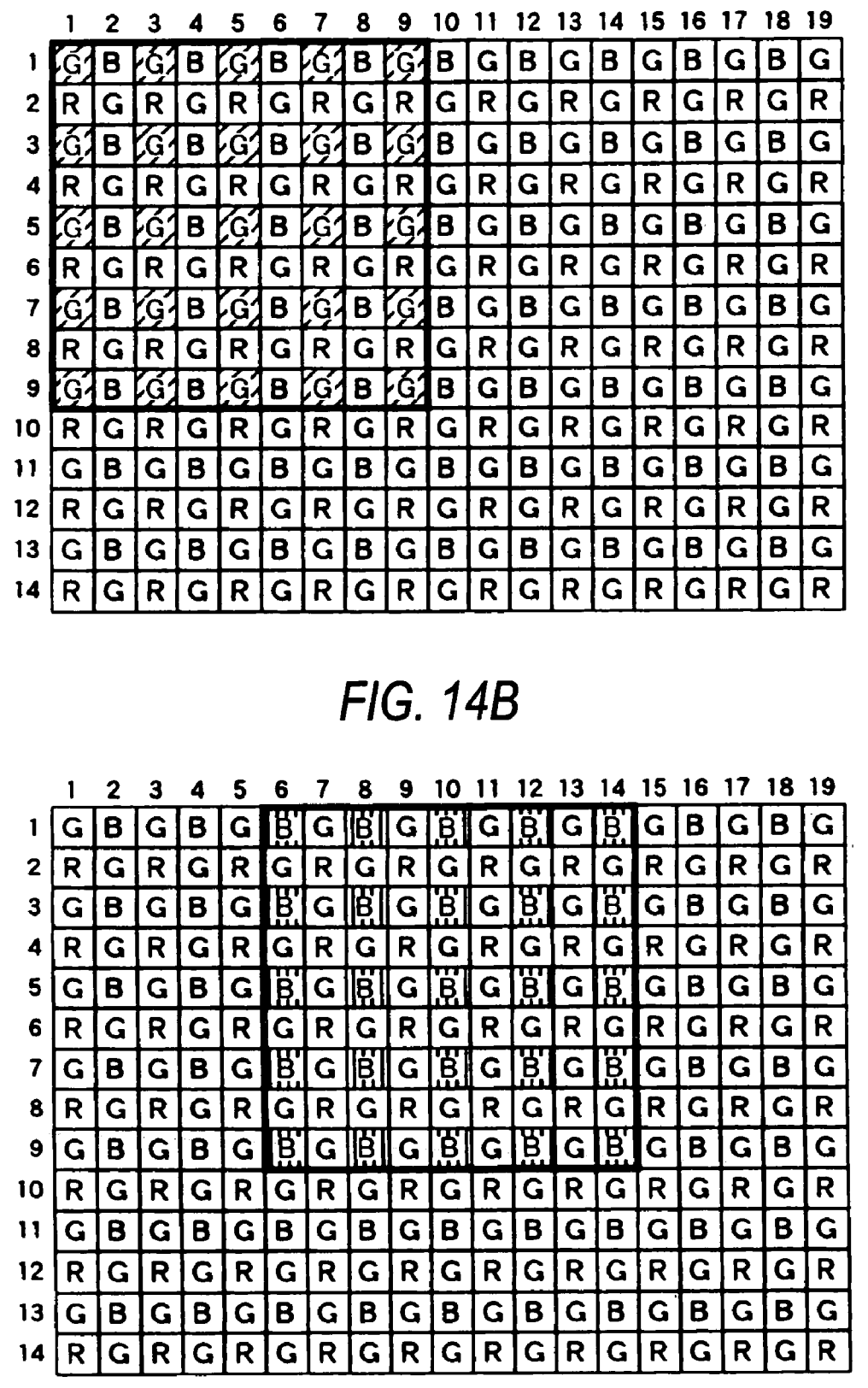

First, as shown in FIG. 14A, pieces of pixel information in first, third, fifth, seventh, and ninth columns of first, third, fifth, seventh, and ninth rows are added and outputted as information for one pixel. Next, as shown in FIG. 14B, pieces of pixel information in sixth, eighth, tenth, twelfth, and fourteenth columns of the first, the third, the fifth, the seventh, and the ninth rows are added and outputted as information for one pixel. Similarly, pieces of pixel information in eleventh, thirteenth, fifteenth, seventeenth, and nineteenth columns of the first, the third, the fifth, the seventh, and the ninth rows are added and outputted as information for one pixel.

Figures 14C, 14D:
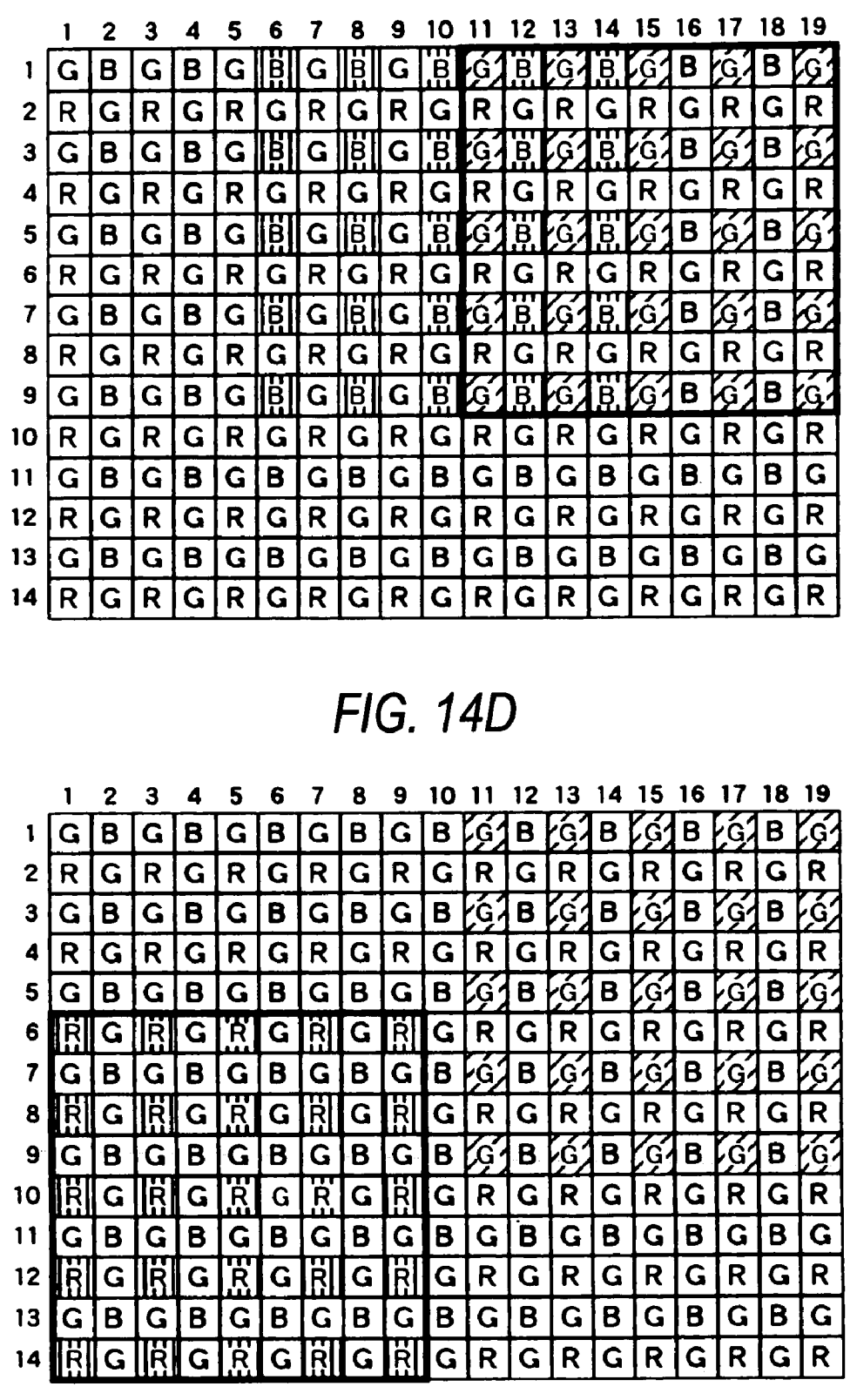

When the same operation is repeated and pixels to be read out reach a last column or a column near the last column as shown in FIG. 14C (a column from which pixel information is read out and subjected to the pixel skipping and adding processing last is changed by setting), as shown in FIG. 14D, five stages below, pieces of pixel information in the first, the third, the fifth, the seventh, and the ninth columns of sixth, eighth, tenth, twelfth, and fourteenth rows are added and outputted as information for one pixel.

In operation <1>, pieces of pixel information in 10n+1st, 10n+3rd, 10n+5th, 10n+7th, and 10n+9th columns of 5m+1st, 5m+3rd, 5m+5th, 5m+7th, and 5m+9th rows are skipped and added to be outputted as information for one pixel. Next, in operation <2>, pieces of pixel information in 10n+6th, 10n+8rd, 10n+10th, 10n+12th, and 10n+14th columns of the 5m+1st, the 5m+3rd, the 5m+5th, the 5m+7th, and the 5m+9th rows are skipped and added to be outputted as information for one pixel.

As a basic operation, the operation <1> and the operation <2> are performed in pair and m and n are positive integers equal to or larger than 0. Starting the operation from m=0 and n=0, first, m is fixed at 0 and n is incremented by one every time the basic operation is performed. When pixels to be read reach a last column or a column near the last column, m is incremented by 1 and n is set to 0. Subsequently, the operation is repeatedly executed until all pieces of pixel information set to be read out are read out. When the pieces of pixel information are skipped and added in this way, a simulative center of gravity of pixels is as shown in FIG. 15. This means that, since pixel information of a same color filter is outputted for each 5×5 unit pixel block, an amount of pixel information is compressed at a ratio of 1/25.

In the explanation of the first to the fourth specific examples, it is assumed that (k+2)×(k+2) pixels are skipped and added in a process of compressing pixel information at a ratio of 1/(k+2)×(k+2), and k=0 (1/4 compression), k=1 (1/9 compression), k=2 (1/16 compression), and k=3 (1/25 compression). The same explanation applies when k is 4 or more. In short, when k is an even number equal to or larger than 4, basically, the same operation as the case of the first and the third specific examples is performed and when k is an odd number equal to or larger than 5, basically, the same operation as the case of the second and the fourth specific examples is performed, whereby the same operational effects can be obtained. An example in which k is an even number equal to or larger than 4 and an example in which k is an odd number equal to or larger than 5 will be explained below.

In the case in which k is an even number equal to or larger than 4, when j is an integer equal to or larger than 1, (2j+4)× (2j+4) pixels are skipped and added and pixel information is compressed at a ratio of 1/(2j+4)×(2j+4). For example, when j=1, that is, when pixel information is compressed at a ratio of 1/36, basic operation <1> and basic operation <2> are performed according to the methods in the first and the third specific examples as described below. In operation A of the operation <1>, pieces of pixel information in 12n+1st, 12n+3rd, 12n+5th, 12n+7th, 12n+9th, and 12n+11th columns of 12m+1st, 12m+3rd, 12m+5th, 12m+7th, 12m+9th, and 12m+11th rows (m and n are positive integers equal to or larger than 0) are skipped and added to be outputted as information for one pixel. Next, in operation B of the operation <1>, pieces of pixel information in 12n+6th, 12n+8th, 12n+10th, 12n+12th, 12n+14th, and 12n+16th columns of the 12m+1st, the 12m+3rd, the 12m+5th, the 12m+7th, the 12m+9th, and the 12m+11th rows are skipped and added to be outputted as information for one pixel.

Next, in operation A of the operation <2>, pieces of pixel information in the 12n+1st, the 12n+3rd, the 12n+5th, the 12n+7th, the 12n+9th, and the 12n+11th columns of 12m+6th, 12m+8th, 12m+10th, 12m+12th, 12m+14th, and 12m+16th rows are skipped and added to be outputted as information for one pixel. Then, in operation B of the operation <2>, pieces of pixel information in the 12n+6th, the 12n+8th, the 12n+10th, the 12n+12th, the 12n+14th, and the 12n+16th columns of 12m+6th, 12m+8th, 12m+10th, 12m+12th, 12m+14th, and 12m+16th rows are skipped and added to be outputted as information for one pixel. In this way, the number of pixels to be read out at a time and added only has to be changed according to the number of pixels to be added while keeping squareness of pixel blocks to be read out at a time. Then, all arbitrary pixels are read out while pixels are skipped in a state in which all pixels are added in a pixel row to be added.

In the case in which k is an odd number equal to or larger than 5, when j is an integer equal to or larger than 1, (2j+5)× (2j+5) pixels are skipped and added and pixel information is compressed at a ratio of 1/(2j+5)×(2j+5). For example, when j=1, that is, when pixel information is compressed at a ratio of 1/49, basic operation <1> and basic operation <2> are performed according to the methods in the second and the fourth specific examples as described below. In the operation <1>, pieces of pixel information in 14n+1st, 14n+3rd, 14n+5th, 14n+7th, 14n+9th, 14n+11th, and 14n+13th columns of 7m+1st, 7m+3rd, 7m+5th, 7m+7th, 7m+9th, 7m+11th, and 7m+13th rows are skipped and added to be outputted as information for one pixel. Then, in the operation <2>, pieces of pixel information in 14n+8th, 14n+10th, 14n+12th, 14n+14th, 14n+16th, 14n+18th, and 14n+20th columns of the 7m+1st, the 7m+3rd, the 7m+5th, the 7m+7th, the 7m+9th, the 7m+11th, and the 7m+13th rows are skipped and added to be outputted as information for one pixel. In this way, the number of pixels to be read out at a time and added only has to be changed according to the number of pixels to be added while keeping squareness of pixel blocks to be read out at a time. Then, all arbitrary pixels are read out while pixels are skipped in a state in which all pixels are added in a pixel row to be added.

In the second and the fourth specific examples, information of all pixels among imaginary pixels is read out. However, it is not always necessary to read out information of all pixels. For example, only pieces of image information of an arbitrary row may be read and skipped and added or, as described in the following modification, vertical columns may be skipped to skip and add pieces of pixel information.

Modification

Next, sixteen pixels are skipped and added and an amount of pixel information is compressed at a ratio of 1/25. This case will be explained with reference to diagrams for explaining operations in FIGS. 16A to 16D.

Figures 16A, 16B:
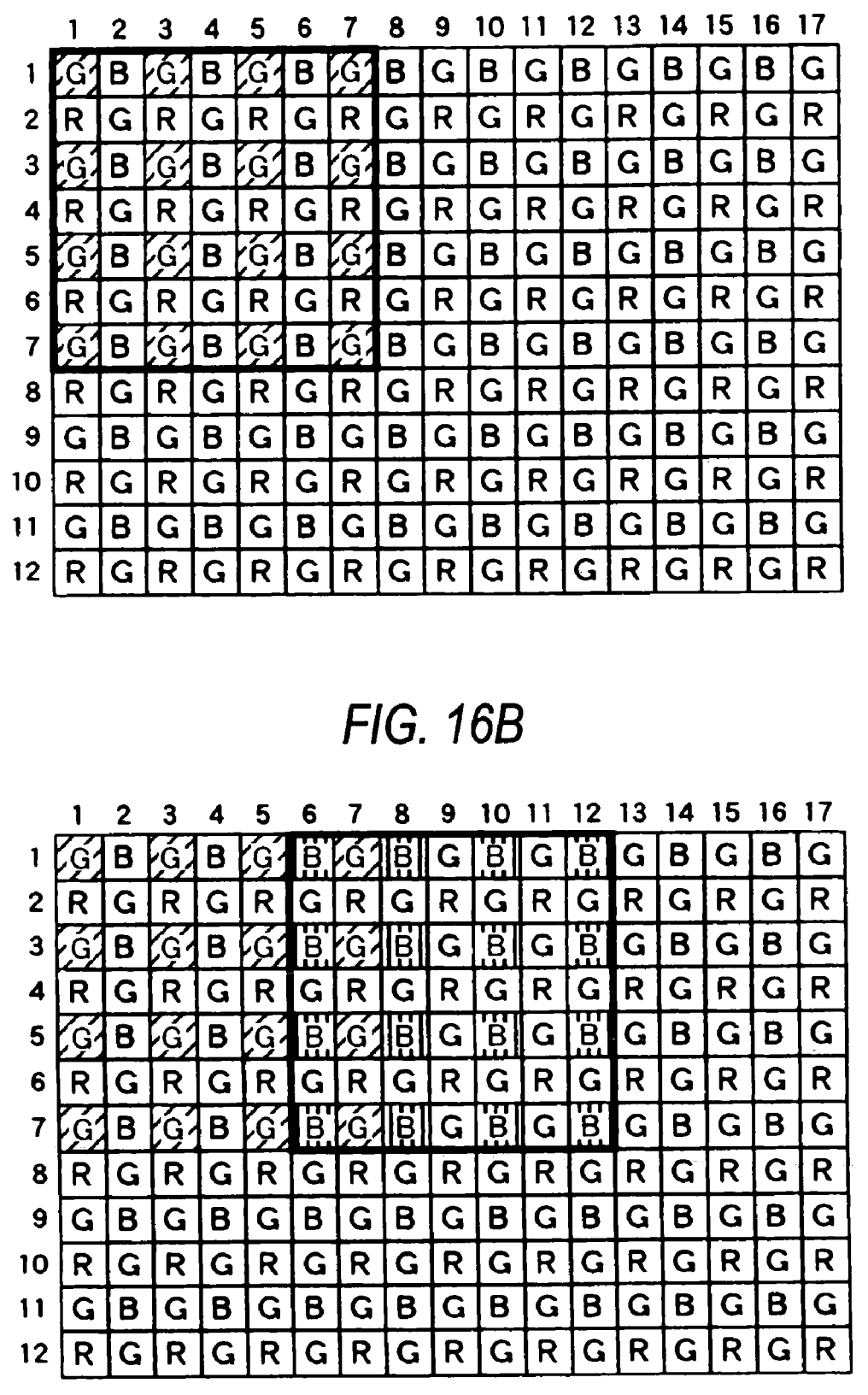

First, as shown in FIG. 16A, pieces of pixel information in first, third, fifth, and seventh columns of first, third, fifth, and seventh rows are added and outputted as information for one pixel. Next, as shown in FIG. 16B, pieces of pixel information in sixth, eighth, tenth, and twelfth columns of the first, the third, the fifth, and the seventh rows are added and outputted as information for one pixel (every time pixel information is read, one pixel row is left out). Similarly, pieces of pixel information in eleventh, thirteenth, fifteenth, and seventeenth columns of the first, the third, the fifth, and the seventh rows are added and outputted as information for one pixel.

Figures 16C, 16D:
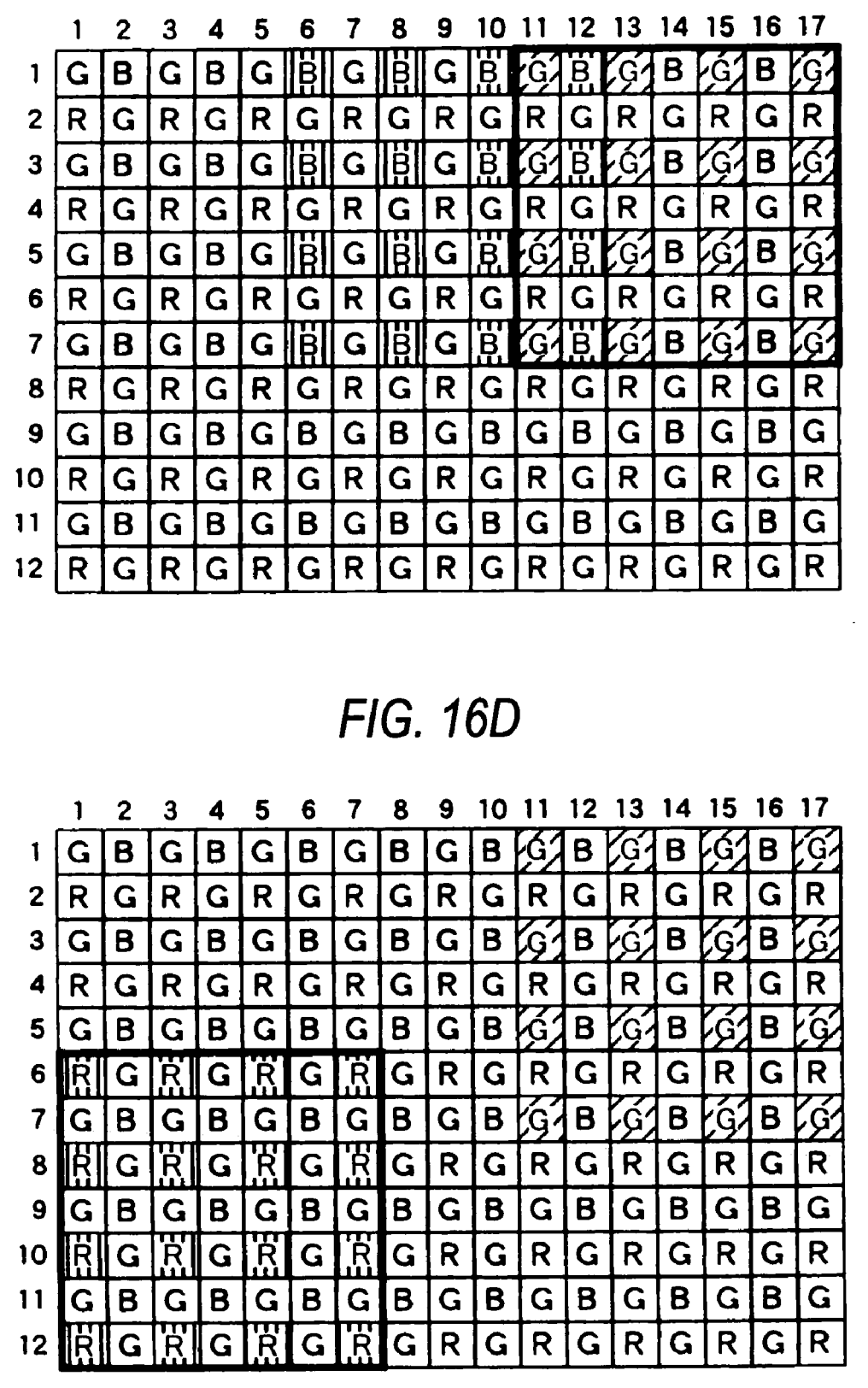

When the same operation is repeated and pixels to be read out reach a last column or a column near the last column as shown in FIG. 16C (a column from which pixel information is read out and subjected to the pixel skipping and adding processing last is changed by setting), as shown in FIG. 16D, five stages below, pieces of pixel information in the first, the third, the fifth, and the seventh columns of sixth, eighth, tenth, and twelfth rows are added and outputted as information for one pixel.

In operation <1>, pieces of pixel information in 10n+1st, 10n+3rd, 10n+5th, and 10n+7th columns of 5m+1st, 5m+3rd, 5m+5th, and 5m+7th rows are skipped and added to be outputted as information for one pixel. Then, in operation <2>, pieces of pixel information in 10n+6th, 10n+8th, 10n+10th, and 10n+12th columns of the 5m+1st, the 5m+3rd, the 5m+5th, and the 5m+7th rows are skipped and added to be outputted as information for one pixel.

As a basic operation, the operation <1> and the operation <2> are repeated, and m and n are positive integers equal to or lager than 0. Starting the operation from m=0 and n=0, first, m is fixed at 0 and n is incremented by one every time the basic operation is performed. When pixels to be read reach a last column or a column near the last column, m is incremented by 1 and n is set to 0. Subsequently, the operation is repeated. When the pieces of pixel information are skipped and added in this way, a simulative center of gravity of pixels is as indicated by shaded parts in FIG. 17. This means that, since pixel information of a same color filter is outputted for each 5×5 unit pixel block, an amount of pixel information is compressed at a ratio of 1/25.

By performing the pixel skipping and adding processing in this way, for example, an increase in a pixel area and leaving-out of pixels in the horizontal direction are eliminated simulatively. Thus, it is possible to reduce an MTF value of a spatial frequency domain equal to or higher than the Nyquist frequency. Consequently, since aliasing noise decreases, it is possible to improve an image quality while reducing the conventional problem of noise in the pixel skipping process. Loads applied on the amplifier unit 18 and the A/D converter 19 can be reduced significantly by performing signal processing while skipping pixel information in the sampling process. Thus, it is possible to read out pixel information at high speed, reduce power consumption, and skip pixel information while keeping both an order of pixel information and a spatial positional relation the same as those in the all-pixel readout.

THIRD EMBODIMENT

Figure 18:
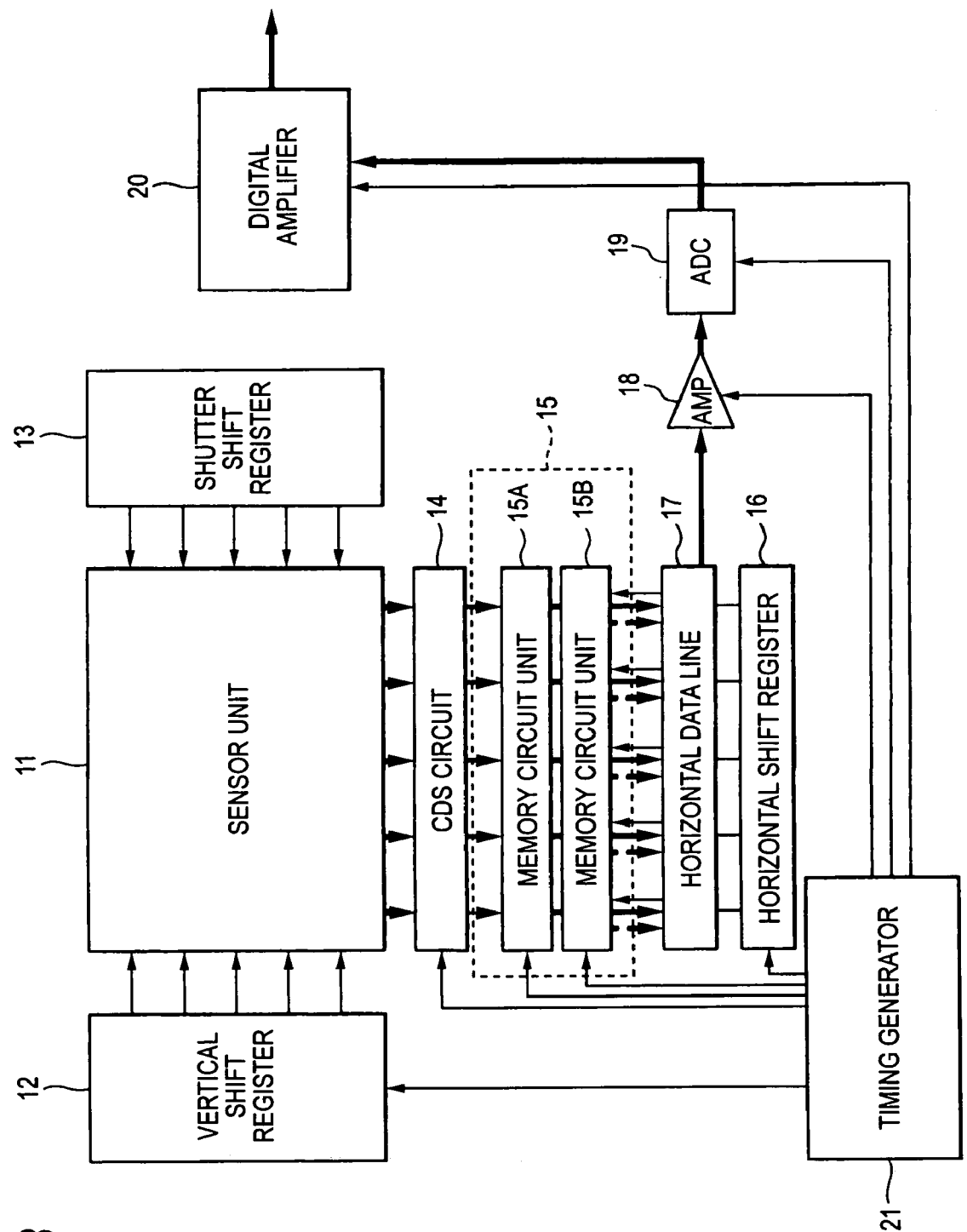
FIG. 18 is a block diagram showing an example of a constitution of a solid state imaging apparatus according to a third embodiment of the invention.

FIG. 18 is a block diagram showing an example of a constitution of a solid state imaging apparatus according to a third embodiment of the invention. In the figure, components equivalent to those in FIG. 1 are denoted by the identical reference numerals and signs. In the solid state imaging apparatus according to this embodiment, again, an X-Y addressable solid state imaging apparatus of a type for reading out information of pixels for one row simultaneously, for example, a CMOS image sensor is used as a solid state imaging apparatus.

In a constitution adopted in the solid state imaging apparatus according to this embodiment, two memory circuits 15A and 15B capable of storing pixel information for one row of the sensor unit 11 are used as the memory circuit unit 15. In this respect, the solid state imaging apparatus according to this embodiment is different from the solid state imaging apparatus according to the first embodiment in terms of the constitution. The solid state imaging apparatus according to this embodiment is significantly different from the solid state imaging apparatus in the first embodiment in terms of operations for, in performing the pixel skipping and readout processing, storing pixel information outputted from the sensor unit 11 in the two memory circuits 15A and 15B and reading out the pixel information from the memory circuit 15A and 15B and outputting the pixel information.

Specifically, a constitution adopted in the solid state imaging apparatus according to this embodiment, when k is a positive integer equal to or larger than 0, in a process of compressing an amount of pixel information at a ratio of $1/(2k+3)\times(2k+3)$, $2k+4$ pixels are skipped and added in a state in which simulative pixel blocks (unit pixel blocks) to be skipped and added are laid without overlapping one another, whereby the pixel information is skipped in a state in which aliasing noise is reduced.

A method of controlling aliasing noise will be explained below with reference to a diagram for explaining operations in FIG. 19. In the method, with a $(2k+3)\times(2k+3)$ pixel block set as a unit pixel block, a pixel size is increased simulatively by adding pieces of pixel information of a color filter of the same color as an arbitrary color filter present in the unit pixel block. Aliasing noise is controlled by reducing an MTF value of a spatial frequency domain equal to or larger than the Nyquist frequency while keeping both an order of pixel information and a spatial positional relation the same as those in the all-pixel readout.

Figures 19, 20:
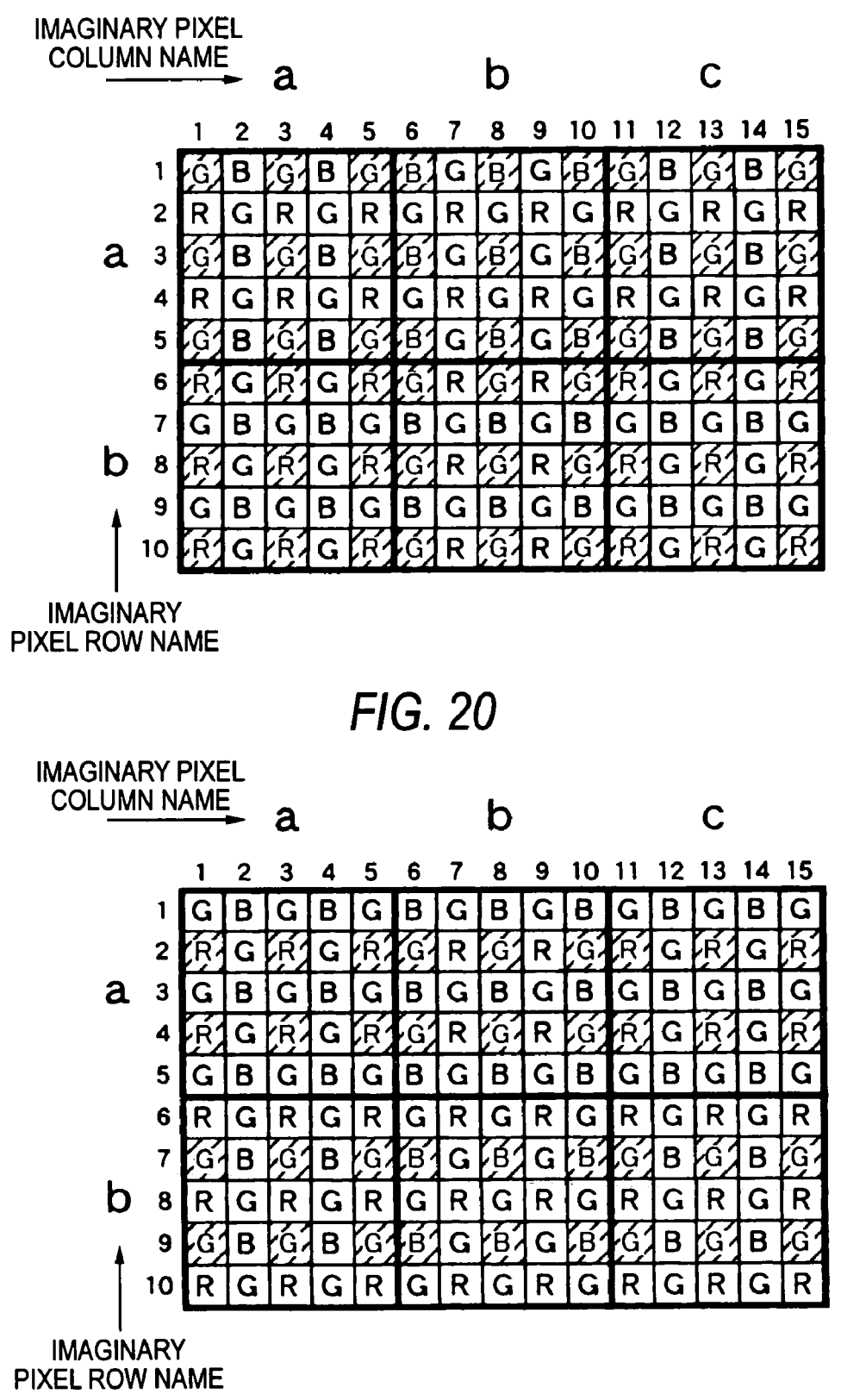

As it is seen from FIG. 19, in this embodiment, in compressing an amount of pixel information at a ratio of 1/15, 5×5 pixel blocks are set as unit pixel blocks (in the figure, blocks surrounded by bold lines on four sides). Note that, for convenience of explanation, imaginary pixel row names a, b, c, and so on and imaginary pixel column names a, b, c, and so on are attached to these unit pixel blocks.

First of all, as shown in FIG. 19, pieces of pixel information of a same color filter (in the figure, shaded parts) in first, third, and fifth columns of a first row and the first, the third, and the fifth columns of a fifth row, that is, pieces of pixel information of a same color, G in this embodiment, in pixel blocks in an ath row and an ath column are added and outputted as information for one pixel. Then, pieces of pixel information of a same color filter in sixth, eighth, and tenth columns of the first row and the sixth, the eighth, and the tenth columns of the fifth row, that is, pieces of pixel information of a same color, B in this embodiment, in pixels blocks in the ath row and a bth column are added and outputted as information for one pixel. Similarly, pieces of pixel information of a same color filter in eleventh, thirteenth, and fifteenth columns of the first row and the eleventh, the thirteenth, and the fifteenth columns of the fifth row, that is, pieces of pixel information of a same color, G in this embodiment, in pixels blocks in the ath row and a cth column are added and outputted as information for one pixel.

Subsequently, the same operation is repeated for the ath row by a unit of a pixel block. Then, when pixels to be read out reach a last column or a column near the last column (a column from which pixel information is read out and subjected to the pixel skipping and adding processing last is changed by setting), five stages below, pieces of pixel information of a same color filter in the first, the third, and the fifth columns of a sixth row and the first, the third, and the fifth columns of a tenth row, that is, pieces of pixel information of a same color, R in this embodiment, in pixel blocks in a bth row and the ath column are added and outputted as information for one pixel.

In short, pieces of pixel information of a same color filter in 3n+1st, 3n+3rd, and 3n+5th columns (n is a positive integer equal to or larger than 0) of 5m+1st and 5m+5th rows (m is a positive integer equal to or larger than 0) are skipped and added to be outputted as information for one pixel. Next, pieces of pixel information of a same color filter in 3n+6th, 3n+8th, and 3n+10th columns of 3m+1st and 3m+5th rows are skipped and added to be outputted as information for one pixel. Subsequently, the same operation is repeated.

When the pieces of pixel information are skipped and added in this way, this means that, since pixel information of a same color filter is outputted for each 5×5 unit pixel block, an amount of pixel information is compressed at a ratio of 1/25. Note that, in this embodiment, combinations of pixel rows to be added are a first row and a fifth row, a sixth row and a tenth row, and so on. However, other than these combinations, for example, combinations of a first row and a third row, a sixth row and an eighth row, and so on, combinations of a third row and a fifth row, an eighth row and a tenth row, and so on, combinations of a first row, a third row, and a fifth row, a sixth row, an eighth row, and a tenth row, and so on are also possible.

Other than the pixel skipping and adding method in FIG. 19 described above, it is also possible to adopt another method. In the method, as shown in FIG. 20, 5×5 pixels are set as one pixel block. For each unit pixel block, pieces of pixel information of a same color filter in 3n+1st, 3n+3rd, and 3n+5th columns of 5m+2nd and 5m+4th rows are skipped and added to be outputted as information for one pixel. Next, pieces of pixel information of a same color filter in 3n+6th, 3n+8th, and 3n+10th columns of 3m+1st and 3m+5th rows are skipped and added to be outputted as information for one pixel. Subsequently, the same operation is repeated.

In the pixel skipping and adding processing described above, a 5×5 pixel block is set as a unit pixel block as an example. The invention is not limited to this. A pixel block represented as (2k+3)×(2k+3) (k is a positive integer equal to or larger than 0) in a general expression is set as a unit pixel block and all pieces of pixel information of a same color in the unit pixel block are added. This makes it possible to increase a pixel area simulatively and skip pixel information while reducing an MTF value of a spatial frequency domain equal to or higher than the Nyquist frequency and keeping both an order of pixel information and a spatial positional relation the same as those in the all-pixel readout.

Figure 21A:
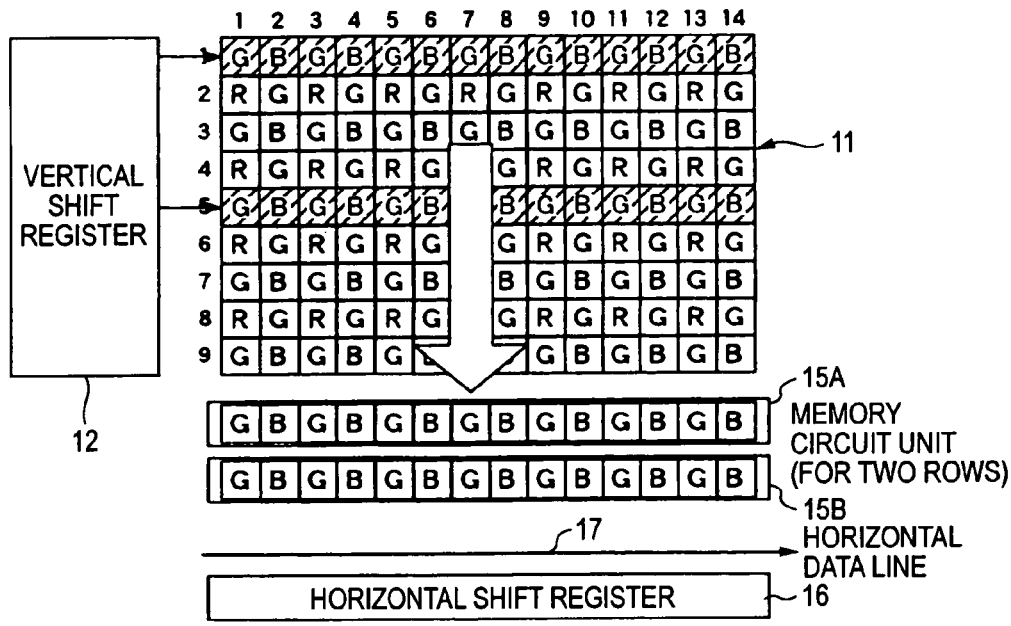
FIGS. 21A to 21C are diagrams schematically showing a relation between a sensor unit and a vertical shift register and a relation among a memory circuit unit, a horizontal shift register, and a horizontal data line.
Figure 21B:
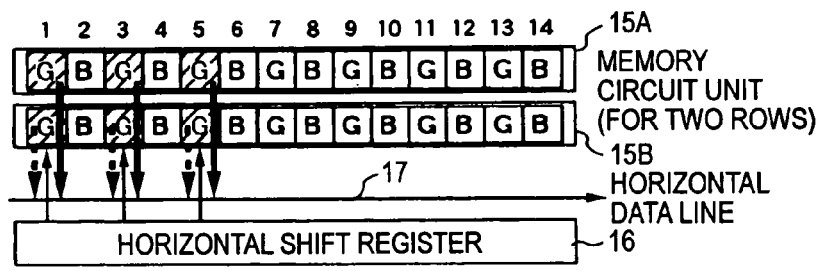
Figure 21C:
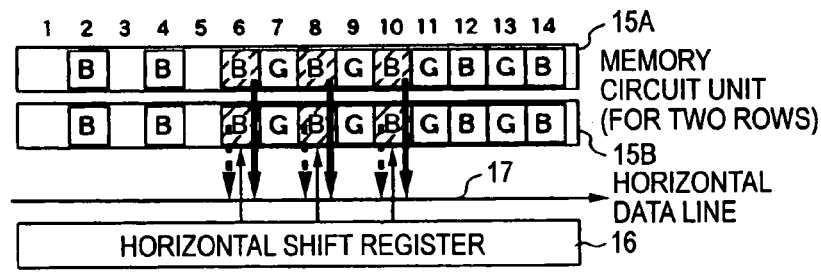

Next, an operation of a process for, in executing the pixel skipping and adding processing described above, storing pixel information outputted from the sensor unit 11 in the memory circuits 15A and 15B and outputting the pixel information from the memory circuits 15A and 15B to the horizontal data line 17 will be explained with reference to FIGS. 21A to 21C. FIGS. 21A to 21C are diagrams schematically showing a relation between the sensor unit 11 in which pixels are arranged in a matrix shape and the vertical shift register 12 and a relation among the memory circuit unit 15 that can store pixel information for two rows, the horizontal shift register 16, and the horizontal data line 17.

First, as shown in FIG. 21A, respective pieces of pixel information in first and fifth rows selected by the vertical shift register 12 are outputted to the memory circuit unit 15 and stored in the two memory circuits 15A and 15B for each of the rows. Next, as shown in FIG. 21B, pieces of pixel information in first, third, and fifth columns selected by horizontal shift register 16 are outputted from the memory circuit 15A and 15B to the horizontal data line 17 simultaneously. Consequently, all the pieces of pixel information in the first, the third, and the fifth columns of the first row and the first, the third, and the fifth columns of the fifth row are added on the horizontal data line 17 and outputted as information for one pixel.

Subsequently, as shown in FIG. 21C, pieces of pixel information in 5n+1st, 5n+3rd, and 5n+5th columns of the first row and the 5n+1st, the 5n+3rd, and the 5n+5th columns of the fifth row (n=1, 2, 3, . . . ) are sequentially selected alternately and outputted from the memory circuits 15A and 15B to the horizontal data line 17. When pieces of pixel information to be added reach a last column or a column near the last column, the vertical shift register 12 selects sixth and tenth rows to output pixel information to the memory circuit unit 15 and causes the memory circuits 15A and 15B to store the pixel information for each of the rows. Subsequently, the same operation is repeated to add and output pieces of pixel information while skipping the pieces of pixel information.

Figure 22A:
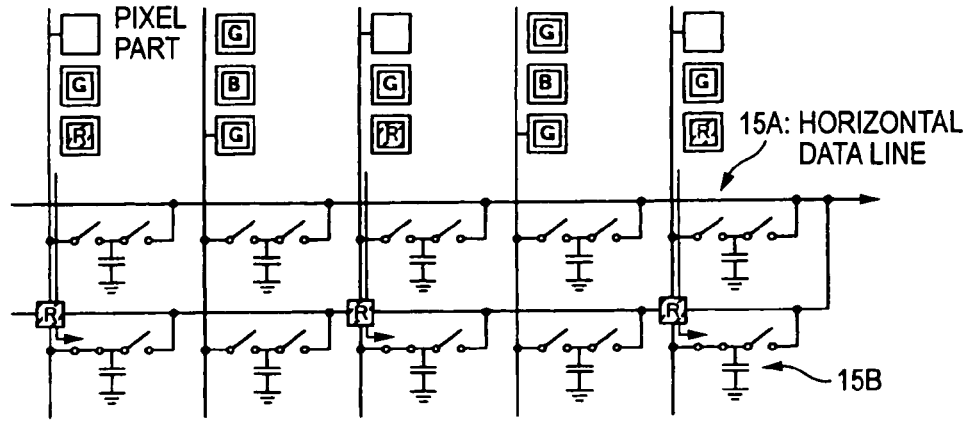
FIGS. 22A to 22C are circuit diagrams showing an example of a relation among two pixel rows, a memory circuit for two rows, and a horizontal data line in the third embodiment.
Figure 22B:
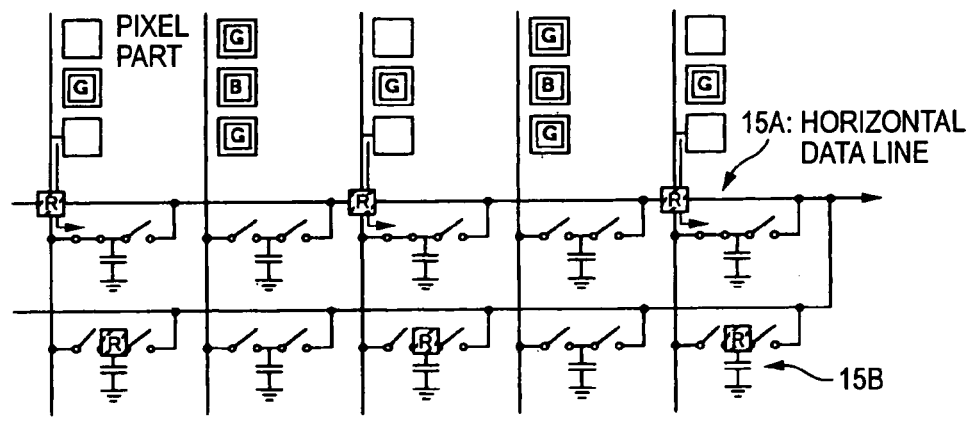
Figure 22C:
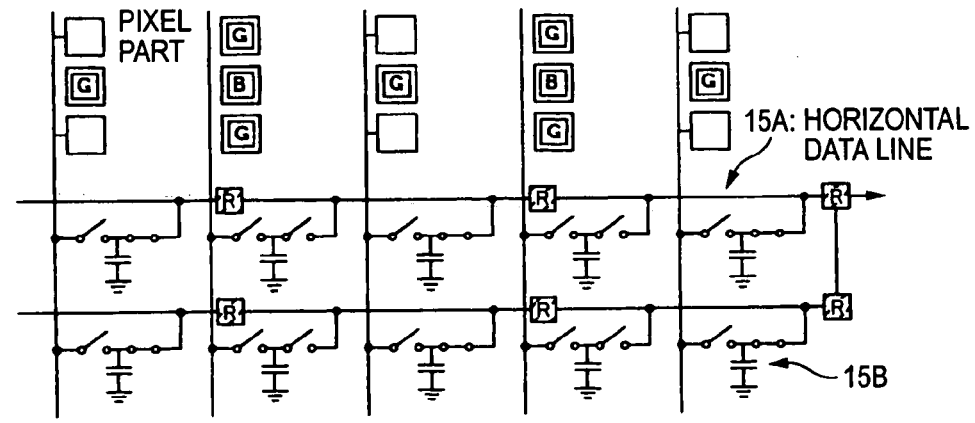

Next, a series of flows of the pixel skipping and adding processing will be explained more in detail using FIGS. 22A to 22C. FIGS. 22A to 22C are circuit diagrams showing, in explaining a pixel skipping and adding process at the time when a 5×5 pixel block is set as a unit pixel block, an example of a relation among kth and k+2nd or kth and k+4th (k is a natural number) pixel rows, the memory circuits 15A and 15B for two rows, and the horizontal data line 17.

FIG. 22A shows a state in which pixel information in the kth row is stored in the lower memory circuit 15B (the same effect is obtained when the pixel information is stored in the upper memory circuit 15A). FIG. 22B shows a state in which pixel information in the k+2nd row is stored in the upper memory circuit 15A (when the pixel information in the kth row is stored in the upper memory circuit 15A, the pixel information in the k+2nd row is stored in the lower memory circuit 15B). According to this operation, pieces of pixel information for the two rows are stored in the memory circuit unit 15. As shown in FIG. 22C, the pieces of pixel information are outputted to the horizontal data line 17 simultaneously to be added.

In this way, with a (2k+3)×(2k+3) pixel block (k is a positive integer equal to or larger than 0) as a unit pixel block, pieces of pixel information of a same color filter in the unit pixel block are added. Consequently, a pixel area increases simulatively and an MTF value decreases in a spatial frequency domain equal to or higher than the Nyquist frequency. Thus, it is possible to reduce aliasing noise at the time of the pixel skipping processing.

In addition, by performing signal processing while skipping pixel information in the sampling process, loads on the amplifier unit 18 and the A/D converter 19 can be reduced significantly. Thus, it is possible to read out pixel information at high speed, reduce power consumption, and skip pixel information while keeping both an order of pixel information and a spatial positional relation the same as those in the all-pixel readout. In particular, in the solid state imaging apparatus according to this embodiment, desired processing can be realized simply by using the memory circuits 15A and 15B for two rows as the memory circuit unit 15. Therefore, since a memory area can be reduced significantly, it is possible to reduce a chip area and expect reduction in cost.

FOURTH EMBODIMENT

A constitution of solid state imaging apparatus according to a fourth embodiment of the invention is the same as the constitution of the solid state imaging apparatus according to the third embodiment in FIG. 18. However, in the solid state imaging apparatus according to this embodiment, when k is a positive integer equal to or larger than 0, in a process of compressing an amount of pixel information at a ratio of $1/(2k+3)\times(2k+3)$, $2k+6$ pixels are skipped and added in a state in which simulative pixel blocks (unit pixel blocks) to be skipped and added are laid overlapping one another, whereby the pixel information is skipped in a state in which aliasing noise is reduced.

FIRST SPECIFIC EXAMPLE

In a case of a first specific example, k=0, in other words, six pixels are skipped and added and an amount of pixel information is compressed at a ratio of 1/9. This case will be explained with reference to diagrams for explaining operations in FIGS. 23A to 23E.

Figures 23A, 23B, 23C:
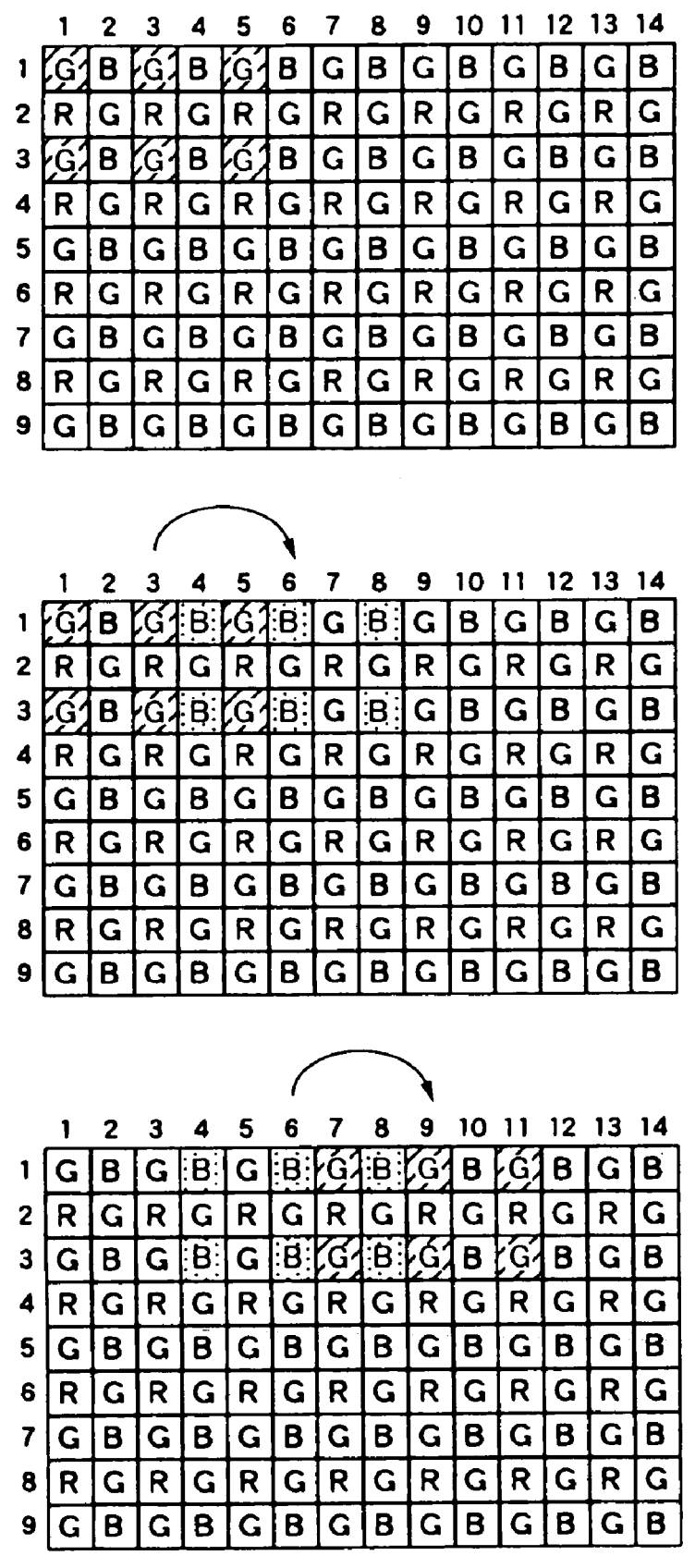

First, as shown in FIG. 23A, pieces of pixel information in first, third, and fifth columns of a first row and the first, the third, and the fifth columns of a third row are added and outputted as information for one pixel. Then, as shown in FIG. 23B, pieces of pixel information in fourth, sixth, and eighth columns of the first row and the fourth, the sixth, and the eighth columns of the third row are added and outputted as information for one pixel. Similarly, as shown in FIG. 23C, pieces of pixel information in seventh, ninth, and eleventh columns of the first row and the seventh, the ninth, and the eleventh columns of the third row are added and outputted as information for one pixel.

Figures 23D, 23E, 24:
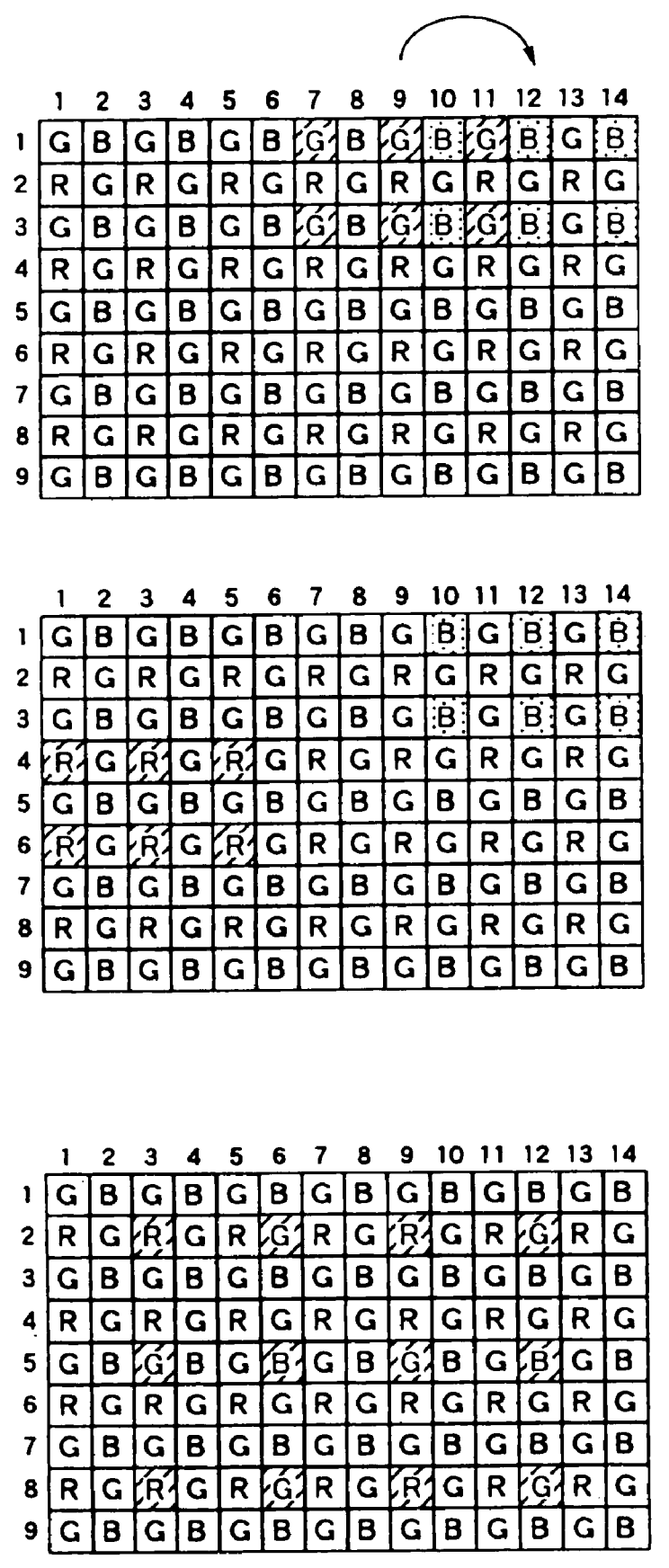

When the same operation is repeated and pixels to be read out reach a last column or a column near the last column as shown in FIG. 23D (a column from which pixel information is read out and subjected to the pixel skipping and adding processing last is changed by setting), as shown in FIG. 23E, three stages below, pieces of pixel information in the first, the third, and the fifth columns of a fourth row and the first, the third, and the fifth columns of a sixth row are added and outputted as information for one pixel.

In short, in operation <1>, pieces of pixel information in 6n+1st, 6n+3rd, and 6n+5th columns of 3m+1st and 3m+3rd rows (m and n are positive integers equal to or larger than 0) are skipped and added to be outputted as information for one pixel. Next, in operation <2>, pieces of pixel information in 6n+4th, 6n+6th, and 6n+8th columns of the 3m+1st and the 3m+3rd rows are skipped and added to be outputted as information for one pixel. With a pair of the operation <1> and the operation <2> as a basic operation, starting the operation from m=0 and n=0, first, m is fixed at 0 and n is incremented by one every time the basic operation is performed. When pixels to be read reach a last column or a column near the last column, m is incremented by 1 and n is set to 0. Subsequently, the same operation is repeatedly executed. All pixels are read out while pixels are skipped in a state in which all pixels are added in a pixel row to be added. When the pieces of pixel information are skipped and added in this way, a simulative center of gravity of pixels is as shown in FIG. 24. This means that, since pixel information of a same color filter is outputted for each 3×3 unit pixel block, an amount of pixel information is compressed at a ratio of 1/9.

Figure 25A:
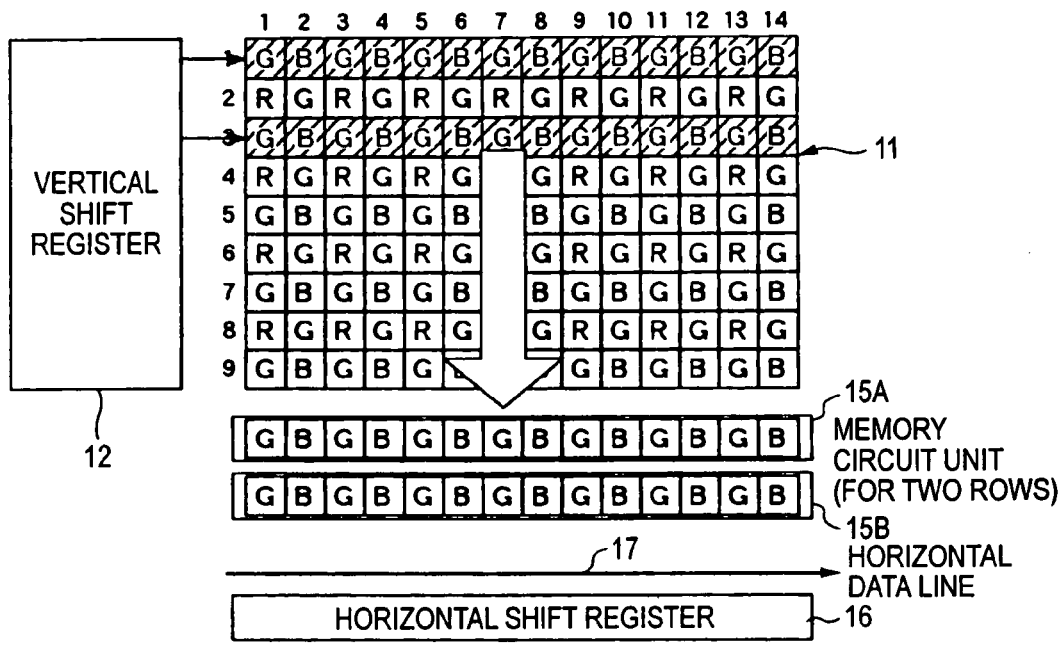
FIGS. 25A to 25C are circuit diagrams showing an example of a relation among two pixel rows, a memory circuit for two rows, and a horizontal data line in the fourth embodiment.
Figure 25B:
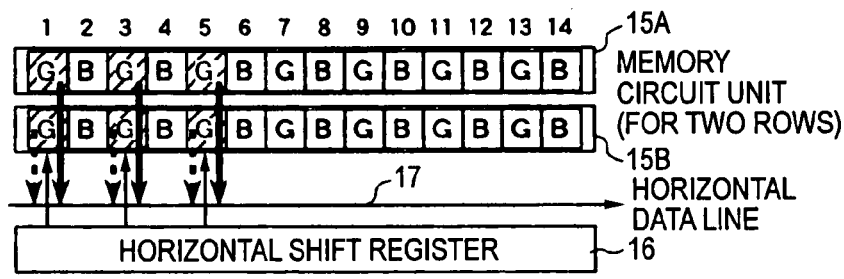
Figure 25C:
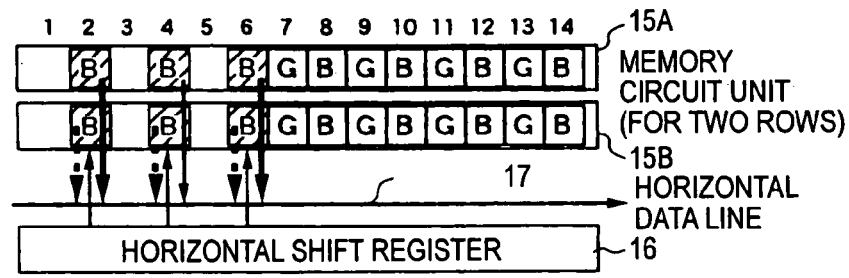
Figure 30A:
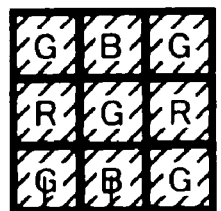
FIGS. 30A to 30C are diagrams for explaining a problem in the first conventional technique.
Figure 30B:
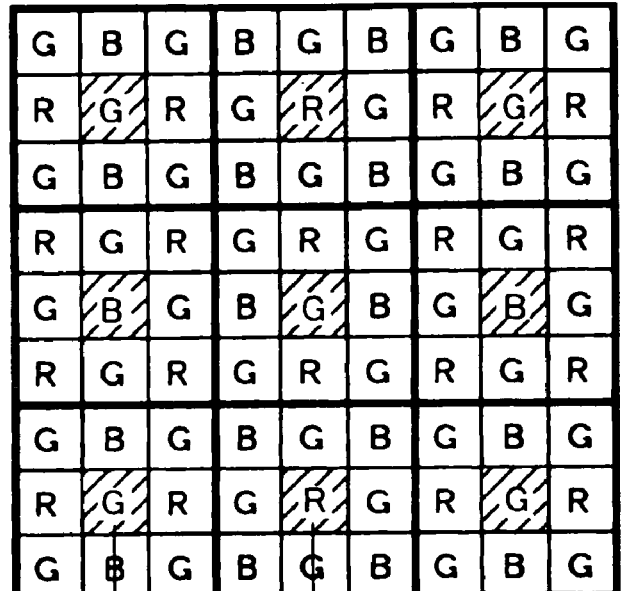
Figure 30C:
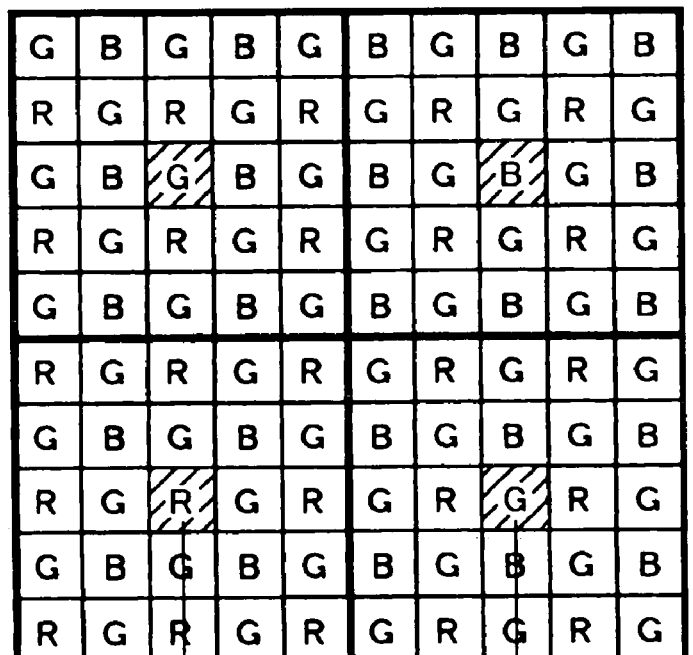
Figure 31:
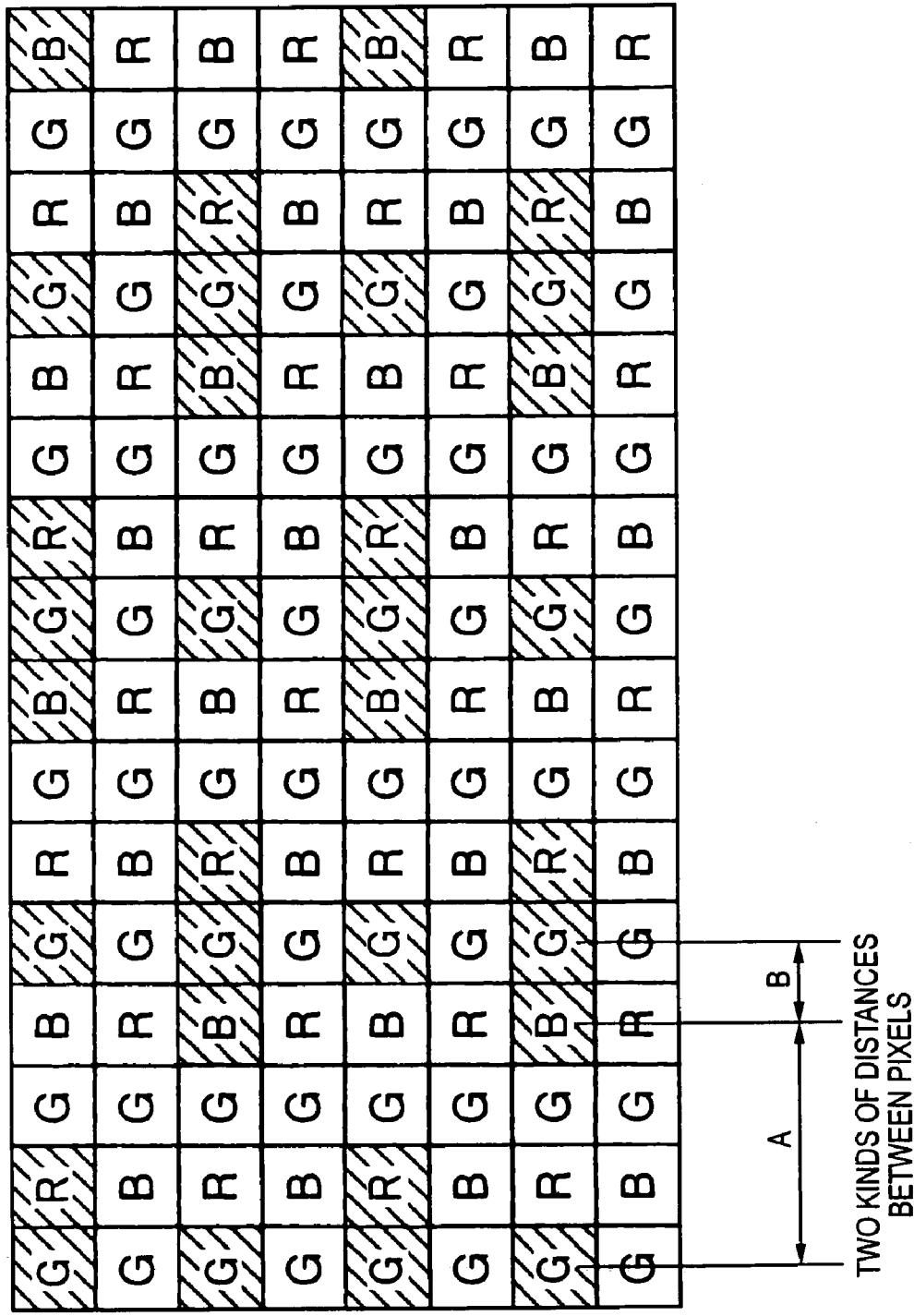
FIG. 31 is a diagram for explaining a problem in the second conventional technique.

Next, an operation of a process for, in executing the pixel skipping and adding processing described above, storing pixel information outputted from the sensor unit 11 in the memory circuits 15A and 15B and outputting the pixel information from the memory circuits 15A and 15B to the horizontal data line 17 will be explained with reference to FIGS. 25A to 25C. FIGS. 25A to 25C are diagrams schematically showing a relation between the sensor unit 11 in which pixels are arranged in a matrix shape and the vertical shift register 12 and a relation among the memory circuit unit 15 that can store pixel information for two rows, the horizontal shift register 16, and the horizontal data line 17.

First, as shown in FIG. 25A, respective pieces of pixel information in first and third rows selected by the vertical shift register 12 are outputted to the memory circuit unit 15 and stored in the two memory circuits 15A and 15B for each of the rows. Next, as shown in FIG. 25B, pieces of pixel information in first, third, and fifth columns selected by horizontal shift register 16 are outputted from the memory circuit 15A and 15B to the horizontal data line 17 simultaneously. Consequently, all the pieces of pixel information in the first, the third, and the fifth columns of the first row and the first, the third, and the fifth columns of the third row are added on the horizontal data line 17 and outputted as information for one pixel.

Subsequently, as shown in FIGS. 23A to 23E, pieces of pixel information in the 6n+1st, the 6n+3rd, and the 6n+5th columns and the 6n+4th, the 6n+6th, and the 6n+8th columns are sequentially selected alternately and outputted from the memory circuits 15A and 15B to the horizontal data line 17. When pieces of pixel information to be added reach a last column or a column near the last column, the vertical shift register 12 selects fourth and sixth rows to output pixel information to the memory circuit unit 15 and causes the memory circuits 15A and 15B to store the pixel information for each of the rows. Subsequently, the same operation is repeated to add and output pieces of pixel information while skipping the pieces of pixel information.

SECOND SPECIFIC EXAMPLE

As in the case of the first specific example, in a case of a second specific example, k=0, in other words, six pixels are skipped and added and an amount of pixel information is compressed at a ratio of 1/9. This case will be explained with reference to diagrams for explaining operations in FIGS. 26A to 26E.

Figures 26A, 26B, 26C:
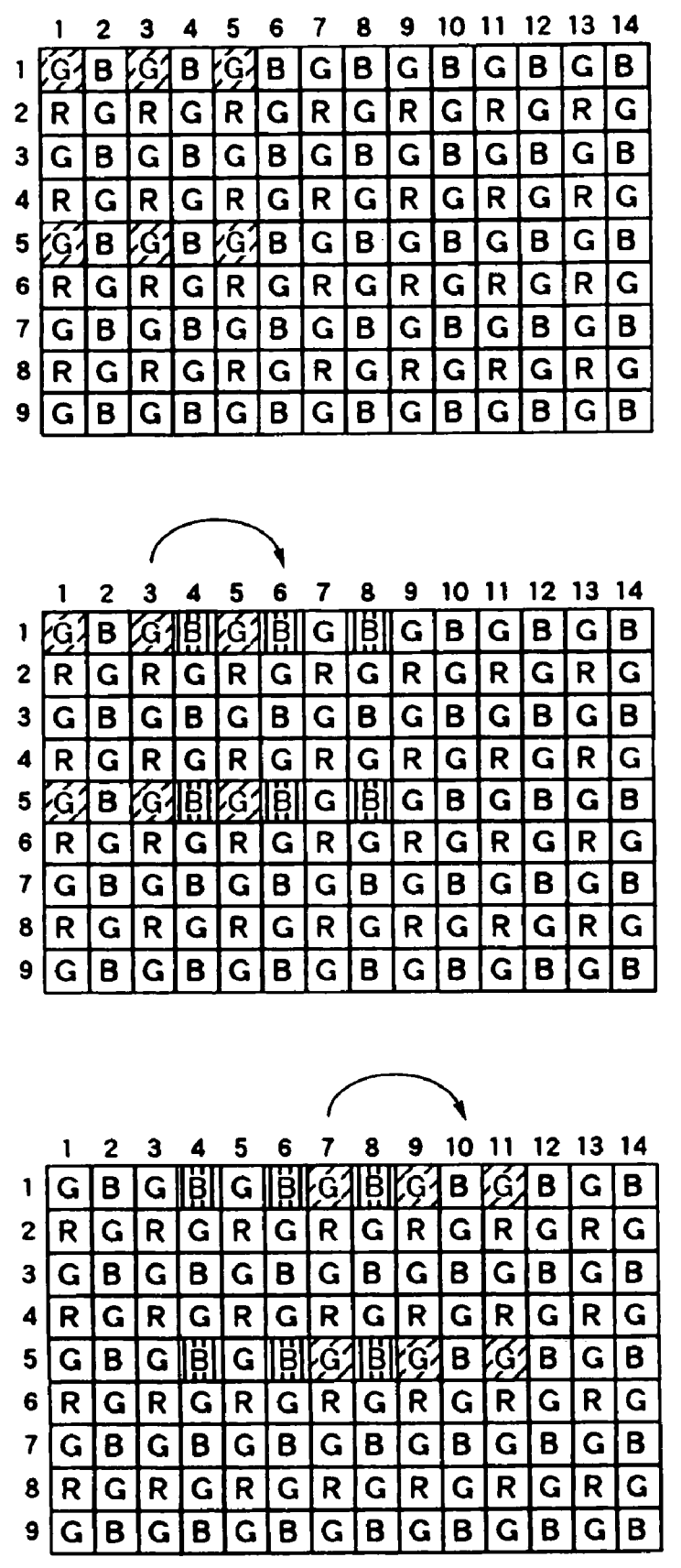

First, as shown in FIG. 26A, pieces of pixel information in first, third, and fifth columns of a first row and the first, the third, and the fifth columns of a fifth row are added and outputted as information for one pixel. Then, as shown in FIG. 26B, pieces of pixel information in fourth, sixth, and eighth columns of the first row and the fourth, the sixth, and the eighth columns of the fifth row are added and outputted as information for one pixel. Similarly, as shown in FIG. 26C, pieces of pixel information in seventh, ninth, and eleventh columns of the first row and the seventh, the ninth, and the eleventh columns of the fifth row are added and outputted as information for one pixel.

Figures 26D, 26E:
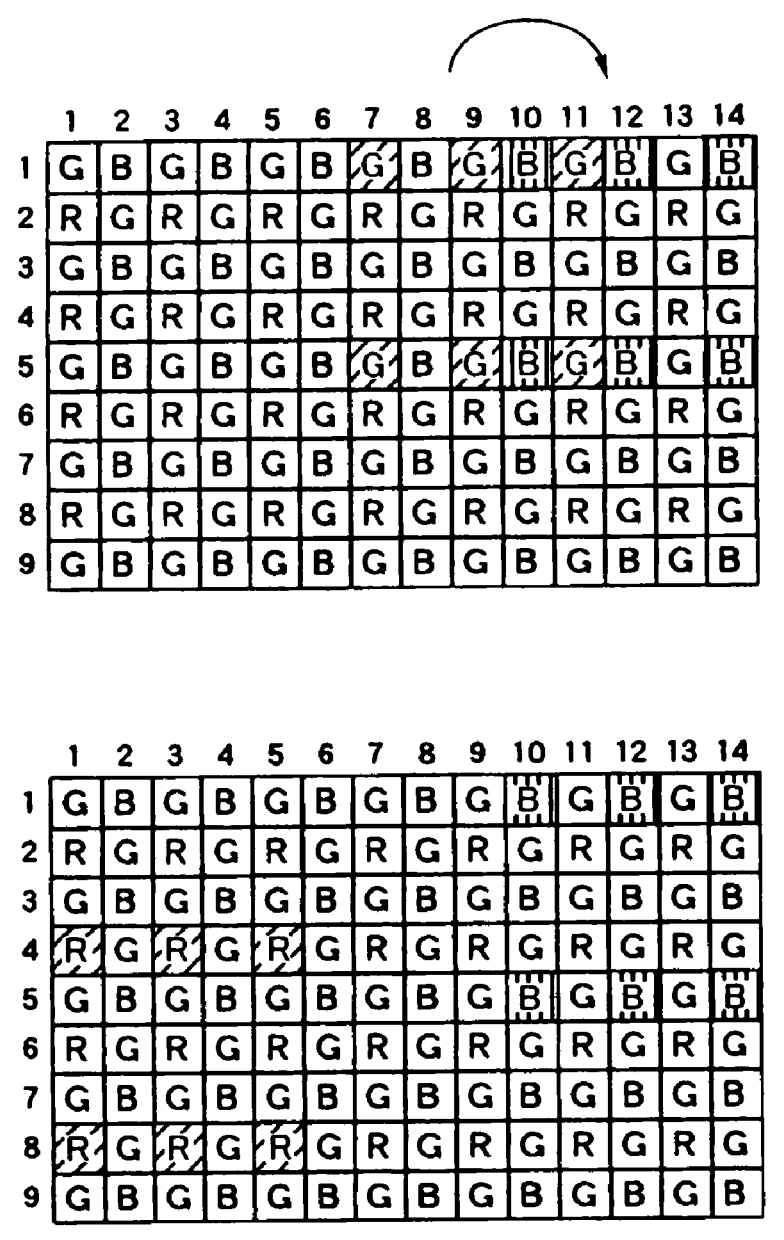

When the same operation is repeated and pixels to be read out reach a last column or a column near the last column as shown in FIG. 26D (a column from which pixel information is read out and subjected to the pixel skipping and adding processing last is changed by setting), as shown in FIG. 26E, three stages below, pieces of pixel information in the first, the third, and the fifth columns of a fourth row and the first, the third, and the fifth columns of a eighth row are added and outputted as information for one pixel.

In short, pieces of pixel information in 6n+1st, 6n+3rd, and 6n+5th columns of 3m+1st and 3m+5th rows (m and n are positive integers equal to or larger than 0) are skipped and added to be outputted as information for one pixel. Next, pieces of pixel information in 6n+4th, 6n+6th, and 6n+8th columns of the 3m+1st and the 3m+3rd rows are skipped and added to be outputted as information for one pixel. Subsequently, the same operation is repeated. When the pieces of pixel information are skipped and added in this way, a simulative center of gravity of pixels is as shown in the shaded parts in FIG. 27. This means that, since pixel information of a same color filter is outputted for each 3×3 unit pixel block, an amount of pixel information is compressed at a ratio of 1/9.

An operation of a process for storing pixel information in the memory circuits 15A and 15B and outputting the pixel information from the memory circuits 15A and 15B to the horizontal data line 17 is the same as that shown in FIGS. 25A to 25C. In short, first, respective pieces of pixel information for two rows are stored in the two memory circuits 15A and 15B. Pieces of pixel information in the 6n+1st, the 6n+3rd, and the 6n+5th columns and the 6n+4th, the 6n+6th, and the 6n+8th columns are sequentially selected alternately, skipped and added, and outputted to the horizontal data line 17 as information for one pixel. When pieces of pixel information to be added reach a last column or a column near the last column, the vertical shift register 12 selects fourth and eighth rows to output pixel information to the memory circuit unit 15 and causes the memory circuits 15A and 15B to store the pixel information for each of the rows. Subsequently, the same operation is repeated to add and output pieces of pixel information while skipping the pieces of pixel information.

THIRD SPECIFIC EXAMPLE

In a case of a third specific example, k=1, in other words, eight pixels are skipped and added and an amount of pixel information is compressed at a ratio of 1/25. This case will be explained with reference to diagrams for explaining operations in FIGS. 28A to 28D.

Figures 28A, 28B:
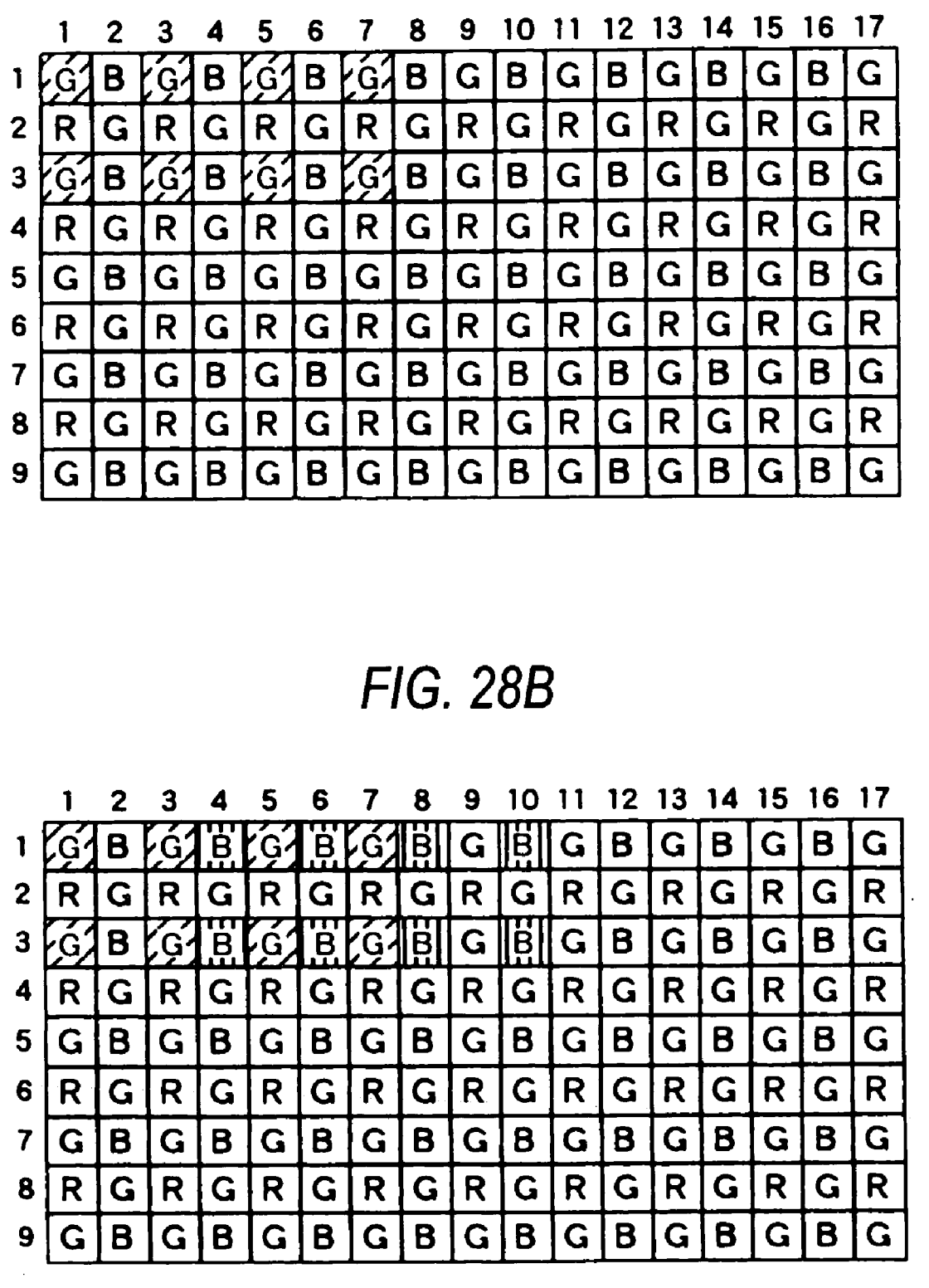

First, as shown in FIG. 28A, pieces of pixel information of in first, third, fifth, and seventh columns of a first row and the first, the third, the fifth, and the seventh columns of a third row are added and outputted as information for one pixel. Next, as shown in FIG. 28B, pieces of pixel information in fourth, sixth, eighth, and tenth columns of the first row and the fourth, the sixth, the eighth, and the tenth columns of the third row are added and outputted as information for one pixel. Similarly, pieces of pixel information in ninth, eleventh, thirteenth, and fifteenth columns of the first row and the ninth, the eleventh, the thirteenth, and the fifteenth columns of the third row are added and outputted as information for one pixel.

When the same operation is repeated and pixels to be read out reach a last column or a column near the last column as shown in FIG. 28C (a column from which pixel information is read out and subjected to the pixel skipping and adding processing last is changed by setting), as shown in FIG. 28D, three stages below, pieces of pixel information in the first, the third, the fifth, and the seventh columns of a fourth row and the first, the third, the fifth, and the seventh columns of a sixth row are added and outputted as information for one pixel.

In short, in operation A of operation <1>, pieces of pixel information in 8n+1st, 8n+3rd, 8n+5th, and 8n+7th columns of 8m+1st and 8m+3rd rows (m and n are positive integers equal to or larger than 0) are skipped and added to be outputted as information for one pixel. Next, in operation B of the operation <1>, pieces of pixel information in 8n+4th, 8n+6th, 8n+8th, and 8n+10th columns of the 8m+1st and the 8m+3rd rows are skipped and added to be outputted as information for one pixel. A value of m is fixed and, when a series of operation A and operation B end, n is incremented by 1 before shifting to the next operation A and operation B. Subsequently, in the same manner, the operation A and the operation B are repeated to the end of a column or near the end of the column in order of A, B, A, B, A, B, and so on.

When pixel information is read up to a last column or a column near the last column, next, in operation A of operation <2>, pieces of pixel information in the 8n+1st, the 8n+3rd, the 8n+5th, and the 8n+7th columns of the 8m+4th and the 8m+6th rows are skipped and added to be outputted as information for one pixel. Next, in operation B of the operation <2>, pieces of pixel information in the 8n+4th, the 8n+6th, the 8n+8th, and the 8n+10th columns of the 8m+4th and the 8m+6th rows are skipped and added to be outputted as information for one pixel. A value of m is fixed and, when a series of operation A and operation B end, n is incremented by 1 before shifting to the next operation A and operation B. Subsequently, in the same manner, the operation A and the operation B are repeated to the end of a column or near the end of the column in order of A, B, A, B, A, B, and so on.

When pixel information is read up to a last column or a column near the last column in this row, a value of m is incremented by 1 and the operation <1> and the operation <2> are performed. Then, until all pieces of pixel information set to be read out are read out, the series of operation described above is repeated. When the pieces of pixel information are skipped and added in this way, a simulative center of gravity of pixels is as shown in FIG. 29. This means that, since pixel information of a same color filter is outputted for each 4×4 unit pixel block, an amount of pixel information is compressed at a ratio of 1/16.

An operation of a process for storing pixel information in the memory circuit unit 15 and outputting the pixel information from the memory circuit unit 15 to the horizontal data line 17 is the same as that shown in FIGS. 25A to 25C. In short, first, respective pieces of pixel information for two rows are stored in the two memory circuits 15A and 15B. Pieces of pixel information in the 8n+1st, the 8n+3rd, the 8n+5th, and the 8n+7th columns and the 8n+4th, the 8n+6th, the 8n+8th, and the 8n+10th columns are sequentially selected alternately, skipped and added, and outputted to the horizontal data line 17 as information for one pixel. When pieces of pixel information to be added reach a last column or a column near the last column, the vertical shift register 12 selects fourth and sixth rows to output pixel information to the memory circuits 15A and 15B and causes the memory circuits 15A and 15B to store the pixel information for each of the rows. Subsequently, the same operation is repeated to add and output pieces of pixel information while skipping the pieces of pixel information.

In this specific example, in the operation <1>, the 8m+1st and the 8m+3rd rows (in the operation <2>, the 8m+4th and the 8m+6th rows) are selected as rows, from which pixel information is read out, and skipped and added. However, the same effect is obtained whichever two rows among the 8m+1st, the 8m+3rd, the 8m+5th, and the 8m+7th (in the operation <2>, the 8m+4th, the 8m+6th, the 8m+8th, and the 8m+10th) are selected.

Other than the first to the third specific examples described above, when j is set as an integer equal to or larger than 1, it is possible to adopt a method of skipping and adding $(2j+3) \times 2$ pixels in a process of compressing pixel information at a ratio of $1/(2j+3) \times (2j+3)$ and a method of skipping and adding $(2j+4) \times 2$ pixels in a process of compressing pixel information at a ratio of $1/(2j+4) \times (2j+4)$. When the former method is adopted, basically, the same operation as the case of the first and the second specific examples is performed. When the latter method is adopted, basically, the same operation as the case of the third specific example is performed. Consequently, it is possible to obtain the same operational effect as described above. These methods will be hereinafter explained citing an example.

In the case in which pixel information is compressed at a ratio of $1/(2j+3) \times (2j+3)$, for example, when j=1, in other words, pixel information is compressed at a ratio of 1/25, the basic operation <1> and the basic operation <2> are performed according to the method of the first and the second specific examples. In the operation <1>, pieces of pixel information in 10n+1st, 10n+3rd, 10n+5th, 10n+7th, and 10n+9th columns of 5m+1st and 5m+5th rows are skipped and added to be outputted as information for one pixel. Then, in the operation <2>, pieces of pixel information in 10n+6th, 10n+8th, 10n+10th, 10n+12th, and 10n+14th columns of the 5m+1st and the 5m+5th rows are skipped and added to be outputted as information for one pixel (rows may be arbitrary two rows in a unit pixel block). In this way, the number of pixels to be read out at a time and added only has to be changed according to the number of pixels to be added while keeping squareness of pixel blocks to be read out at a time. Then, all arbitrary pixels are read out while pixels are skipped in a state in which all pixels are added in a pixel row to be added.

In the case in which pixel information is compressed at a ratio of $1/(2j+4) \times (2j+4)$, for example, when j=1, in other words, pixel information is compressed at a ratio of 1/36, the basic operation <1> and the basic operation <2> are performed according to the method of the third specific example. In the operation <A> of the operation <1>, pieces of pixel information in 12n+1st, 12n+3rd, 12n+5th, 12n+7th, 12n+9th, and 12n+11th columns of 12m+1st and 12m+3rd rows are skipped and added to be outputted as information for one pixel. Then, in the operation <B> of the operation <1>, pieces of pixel information in 12n+6th, 12n+8th, 12n+10th, and 12n+12th columns of the 12m+1st and the 12m+3rd rows are skipped and added to be outputted as information for one pixel. A value of m is fixed and, when a series of operation A and operation B end, n is incremented by 1 before shifting to the next operation A and operation B. Subsequently, in the same manner, the operation A and the operation B are repeated up to a last column or a column near the last column in order of A, B, A, B, A, B, and so on.

When pixel information is read up to a last column or a column near the last column, next, in the operation <A> of the operation <2>, pieces of pixel information in the 12n+1st, the 12n+3rd, the 12n+5th, the 12n+7th, the 12n+9th, and the 12n+11th columns of 12m+6th and 12m+8th rows are skipped and added to be outputted as information for one pixel. Then, in the operation <B> of the operation <2>, pieces of pixel information in the 12n+6th, the 12n+8th, the 12n+10th, the 12n+12th, 12n+14th, and 12n+16th columns of the 12m+6th and the 12m+8th rows are skipped and added to be outputted as information for one pixel. A value of m is fixed and, when a series of operation A and operation B end, n is incremented by 1 before shifting to the next operation A and operation B. Subsequently, in the same manner, the operation A and the operation B are repeated up to a last column or a column near the last column in order of A, B, A, B, A, B, and so on.

When pixel information is read up to a last column or a column near the last column in this row, a value of m is incremented by 1 and the operation <1> and the operation <2> are performed. The operation only has to be changed in this way. Then, all pixels are read out while pixels are skipped in a state in which all pixels are added in a pixel row to be added.

By performing the pixel skipping and adding processing in this way, for example, an increase in a pixel area and leaving-out of pixels in the horizontal direction are eliminated simulatively. Thus, it is possible to reduce an MTF value of a spatial frequency domain equal to or higher than the Nyquist frequency. Consequently, since aliasing noise decreases, it is possible to improve an image quality while reducing the conventional problem of noise in the pixel skipping process.

In addition, by performing signal processing while skipping pixel information in the sampling process, loads on the amplifier unit 18 and the A/D converter 19 can be reduced significantly. Thus, it is possible to read out pixel information at high speed, reduce power consumption, and skip pixel information while keeping both an order of pixel information and a spatial positional relation the same as those in the all-pixel readout. In particular, in the solid state imaging apparatus according to this embodiment, the memory circuits 15A and 15B for two rows only have to be prepared as the memory circuit unit 15. Therefore, since a memory area can be reduced significantly, it is possible to reduce a chip area and expect reduction in cost.

Note that, in the examples explained in the respective embodiments, in a process of skipping to read out pixel information from the solid state imaging apparatus, with a pixel block consisting of plural pixels adjacent to one another in a row direction and a column direction set as a unit pixel block, pieces of pixel information of a same color filter in the unit pixel block are outputted to the horizontal data line 17 simultaneously via the memory circuit unit 15, whereby the pieces of pixel information are added and read out as pixel information for one pixel simulatively. It is also possible to adopt a constitution in which a result obtained by adding pieces of pixel information once is averaged and outputted as pixel information for one pixel. As an example, when pieces of pixel information for four pixels are added, a result of the addition is averaged as pixel information of a ¼ size. This averaging processing can be realized by using, for example, a programmable amplifier in the amplifier unit 18. A method of this addition/averaging is effective, for example, when an input dynamic range of the circuit following the A/D converter 19 is narrow.

INDUSTRIAL APPLICABILITY

As explained above, according to the invention, with a pixel arrangement of $(2k+3) \times (2k+3)$ (k is an integer equal to or larger than 0) as a unit, pixel information of a filter of the same color as an arbitrary color filter included in the unit pixel block is read out as information for one pixel. Thus, it is possible to increase a pixel area simulatively and reduce an MTF value in a spatial frequency domain equal to or higher than the Nyquist frequency. This makes it possible to reduce aliasing noise. Consequently, various incidental effects such as a reduction in aliasing noise at the time of pixel skipping, a reduction in an amount of output information, a reduction in a load on a signal processing system, realization of high-speed readout following the reduction in a load, a reduction in power consumption through a low frequency of a clock, a reduction in a size of a chip area, and a reduction in cost are obtained.

The invention claimed is:

1. A solid state imaging apparatus comprising:
   an X-Y addressable solid state imaging apparatus in which pixels are arranged in a matrix shape and color filters having predetermined color coding are formed in the respective pixels; and
   a driving unit that, in a process of pixel skipping to read out pixel information from the solid state imaging apparatus, with a pixel block consisting of plural pixels adjacent to one another in a row direction and a column direction set as a unit pixel block, reads out pixel information of a same color filter in the unit pixel block as pixel information for one pixel simultaneously,
   wherein,
   the predetermined color coding has two rows and two columns as a unit and is a repetition of the unit,
   when k is a positive integer equal to or larger than 0, with (2k+3)×(2k+3) pixel blocks as unit pixel blocks, the driving unit reads out pieces of pixel information of the same color filter in each of the unit pixel blocks, the driving unit reads out pieces of pixel information of a same color filter in each of the unit pixel blocks simultatively as pixel information for one pixel in a state in which the unit pixel blocks are laid without overlapping one another, and the driving unit averages the added pieces of pixel information and outputs the averaged pieces of pixel information.

2. A solid state imaging apparatus according to claim 1, wherein the driving unit adds pieces of pixel information of the same color filter in the unit pixel block and outputs the added pieces of pixel information.

3. A solid state imaging apparatus according to claim 2, wherein the driving unit adds the pieces of pixel information in the same color filter in the unit pixel block so as not to destroy a center of gravity of the unit pixel block and outputs the added pieces of pixel information.

4. A solid state imaging apparatus according to claim 2, wherein the driving unit has a memory circuit unit for storing pixel information read out from the solid state imaging apparatus and outputs the pieces of pixel information of the same color filter in the unit pixel block stored in the memory circuit unit to a horizontal data line simultaneously.

5. A solid state imaging apparatus according to claim 1, wherein the driving unit reads out pieces of pixel information of a same color filter in a column arrangement direction or a row arrangement direction in the unit pixel block simultaneously as pixel information for one pixel.

6. A solid state imaging apparatus according to claim 4, wherein the driving unit has first and second memory circuits, which are capable of storing pixel information for one row, respectively, with respect to a pixel arrangement of the solid state imaging apparatus, as the memory circuit unit and outputs the pieces of pixel information of the same color filter in the unit pixel block stored in the first and the second memory circuits, respectively, to the horizontal data line simultaneously.

7. A solid state imaging apparatus according to claim 6, wherein
when k is a positive integer equal to or larger than 0, in a process of compressing an amount of pixel information at a ratio of 1/(2k+3)×(2k+3), the driving unit skips and adds 2k+6 pixels in a state in which the unit pixel blocks to be skipped and added are laid overlapping one another.

8. A method of driving a solid state imaging apparatus using an X-Y addressable solid state imaging apparatus in which pixels are arranged in a matrix shape and color filters having predetermined color coding are formed in the respective pixels, the method comprising:
   in a process of pixel skipping to read out pixel information from the solid state imaging apparatus, with a pixel block consisting of plural pixels adjacent to one another in a row direction and a column direction set as a unit pixel block, reading out pixel information of a same color filter in the unit pixel block as pixel information for one pixel simultaneously,
   wherein,
   the predetermined color coding has two rows and two columns as a unit and is repetition of the unit, and
   when k is a positive integer equal to or larger than 0, with (2k+3)×(2k+3) pixel blocks as unit pixel blocks, pieces of pixel information of a same color filter in each of the unit pixel blocks are read out simultatively as pixel information for one pixel in a state in which the unit pixel blocks are laid without overlapping one another.

9. A method s according to claim 8, further comprising:
   when k=0, attaching imaginary pixel row names a, b, and so on and imaginary pixel column names a, b, and so on to an arrangement of a 3×3 unit pixel block, respectively;
   adding and outputting pieces of pixel information in first and third columns of first and third rows of a pixel arrangement as an output of an ath row and an ath column of the unit pixel block, then, adding and outputting pieces of pixel information in fourth and sixth columns of the first and the third rows of the pixel arrangement as an output of the ath row and a bth column of the unit pixel block, and, subsequently, adding and outputting pieces of pixel information up to a last column or a column close to the last column in the same manner; and
   thereafter, adding and outputting pieces of pixel information in the first and the third columns of fourth and sixth rows of the pixel arrangement as an output of a bth row and the ath column of the unit pixel block and, subsequently, reading out all arbitrary pixels while repeating the same operation and skipping and adding pieces of pixel information.

10. A d method s according to claim 8, further comprising:
    when k=0, attaching imaginary pixel row names a, b, and so on and imaginary pixel column names a, b, and so on to an arrangement of a 3×3 unit pixel block, respectively;
    adding and outputting pieces of pixel information in first and third columns of a second row of a pixel arrangement as an output of an ath row and an ath column of the unit pixel block, then, adding and outputting pieces of pixel information in fourth and sixth columns of the second row of the pixel arrangement as an output of the ath row and a bth column of the unit pixel block, and, subsequently, adding and outputting pieces of pixel information up to a last column or a column close to the last column in the same manner; and
    thereafter, adding and outputting pieces of pixel information in the first and the third columns of a fifth row of the pixel arrangement as an output of a bth row and the ath column of the unit pixel block and, subsequently, reading out all arbitrary pixels while repeating the same operation and skipping and adding pieces of pixel information.

11. A d method according to claim 10, further comprising:
when k=0, attaching imaginary pixel row names a, b, and so on and imaginary pixel column names a, b, and so on to an arrangement of a 3×3 unit pixel block, respectively;
adding and outputting pieces of pixel information in a first column of first and third rows and a third column of a second row of a pixel arrangement as an output of an ath row and an ath column of the unit pixel block, then, adding and outputting pieces of pixel information in a sixth column of the first and the third rows and a fourth column of the second row of the pixel arrangement as an output of the ath row and a bth column of the unit pixel block, and, subsequently, adding and outputting pieces of pixel information up to a last column or a column close to the last column in the same manner; and
thereafter, adding and outputting pieces of pixel information in the first column of fourth and sixth rows and the third column of a fifth row of the pixel arrangement as an output of a bth row and the ath column of the unit pixel block, then, adding and outputting pieces of pixel information in the sixth column of the fourth and the sixth rows and the fourth column of the fifth row of the pixel arrangement as an output in the bth row and the bth column of the unit pixel block, and, subsequently, reading out all arbitrary pixels while repeating the same operation and skipping and adding pieces of pixel information.

\* \* \* \* \*